United States Patent
Gwee et al.

(10) Patent No.: US 11,966,521 B2
(45) Date of Patent: Apr. 23, 2024

(54) BATTERY-OPERATED HANDHELD DEVICE

(71) Applicant: Razer (Asia-Pacific) Pte. Ltd., Singapore (SG)

(72) Inventors: Chang Sern Gwee, Singapore (SG); Wooi Liang Chin, Singapore (SG); Jian Yao Lien, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 0 days.

(21) Appl. No.: 18/256,044

(22) PCT Filed: Dec. 31, 2020

(86) PCT No.: PCT/SG2020/050801
§ 371 (c)(1),
(2) Date: Jun. 5, 2023

(87) PCT Pub. No.: WO2022/146229
PCT Pub. Date: Jul. 7, 2022

(65) Prior Publication Data
US 2024/0045516 A1    Feb. 8, 2024

(51) Int. Cl.
*H01M 50/247* (2021.01)
*G06F 3/0354* (2013.01)

(52) U.S. Cl.
CPC .................. *G06F 3/03543* (2013.01)

(58) Field of Classification Search
None
See application file for complete search history.

(56) References Cited

U.S. PATENT DOCUMENTS

| 5,686,811 A | 11/1997 | Bushong et al. |
| 6,373,706 B1 | 4/2002 | Kasahara et al. |

(Continued)

FOREIGN PATENT DOCUMENTS

| CN | 2904097 Y | 5/2007 |
| CN | 108595033 A | 9/2018 |
| EP | 2479641 B1 | 3/2017 |

OTHER PUBLICATIONS

"The 4 Best Batteries for Wireless Mice" [https://www.batteryproducts.com/Best/Batteries/WirelessMouse#:~.text=What kind of batteries do,power capacity compared to AAA] 2020 (4 pages).

(Continued)

*Primary Examiner* — Carl Adams
(74) *Attorney, Agent, or Firm* — Polsinelli PC

(57) ABSTRACT

A battery-operated handheld device including a housing to enclose electrical components and a battery holder. The battery holder including a first battery slot and a second battery slot. The first and second battery slots being sized to hold batteries of different battery sizes. The second battery slot being alongside the first battery slot. The electrical components of the handheld device may be powered by either the first battery inserted into the first battery slot or the second battery inserted into the second battery slot. The battery holder may serve as an adjustable weight distribution mechanism to shift a centre of gravity of the handheld device between a first predetermined centre of gravity associated with the first battery inserted into the first battery slot and a second predetermined centre of gravity associated with the second battery inserted into the second battery slot.

20 Claims, 6 Drawing Sheets

(56) References Cited

U.S. PATENT DOCUMENTS

| | | | |
|---|---|---|---|
| 6,411,281 | B1 | 6/2002 | Sasselli et al. |
| 7,514,172 | B2 | 4/2009 | Furth et al. |
| 7,780,009 | B2 | 8/2010 | Casanova |
| 7,780,309 | B2 | 8/2010 | McMillan et al. |
| 7,897,276 | B2 | 3/2011 | Campesi et al. |
| 7,909,478 | B2 | 3/2011 | Dallas |
| 8,810,194 | B2 | 8/2014 | Kirby et al. |
| 9,954,205 | B2 | 4/2018 | Liu et al. |
| 10,027,078 | B2 | 7/2018 | Knight |
| 2001/0026264 | A1 | 10/2001 | Rosenberg |
| 2006/0108979 | A1 | 5/2006 | Daniel et al. |
| 2008/0007206 | A1 | 1/2008 | Velissaris et al. |
| 2009/0009475 | A1 | 1/2009 | Schuette |
| 2014/0168915 | A1 | 6/2014 | Wang |
| 2014/0210720 | A1 | 7/2014 | Chang |
| 2017/0205900 | A1 | 7/2017 | Su |
| 2022/0149470 | A1* | 5/2022 | Lu ........................ G06F 3/039 |

OTHER PUBLICATIONS

Jerry Jackson Reads, "Kensington Pro Fit Mid-Size Wireless Mouse Review" [www.notebookreview.com/review/kensington-pro-fit-mid-size-wireless-mouse-review/] Oct. 10, 2014 (6 pages).
ISR/WO issued for corresponding International Application No. PCT/SG2020/050801 (6 pages).
European Office search report; dated Jan. 29, 2024; application #20968116.2.

\* cited by examiner

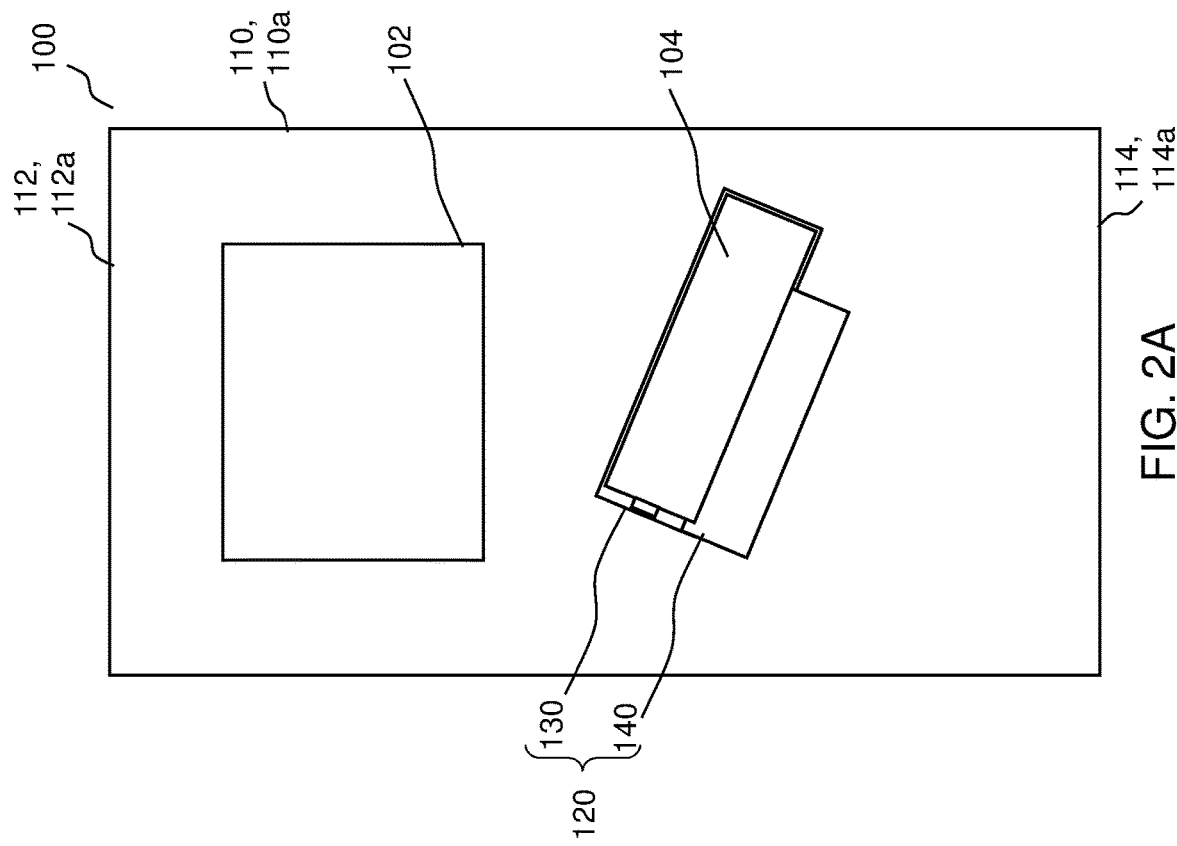
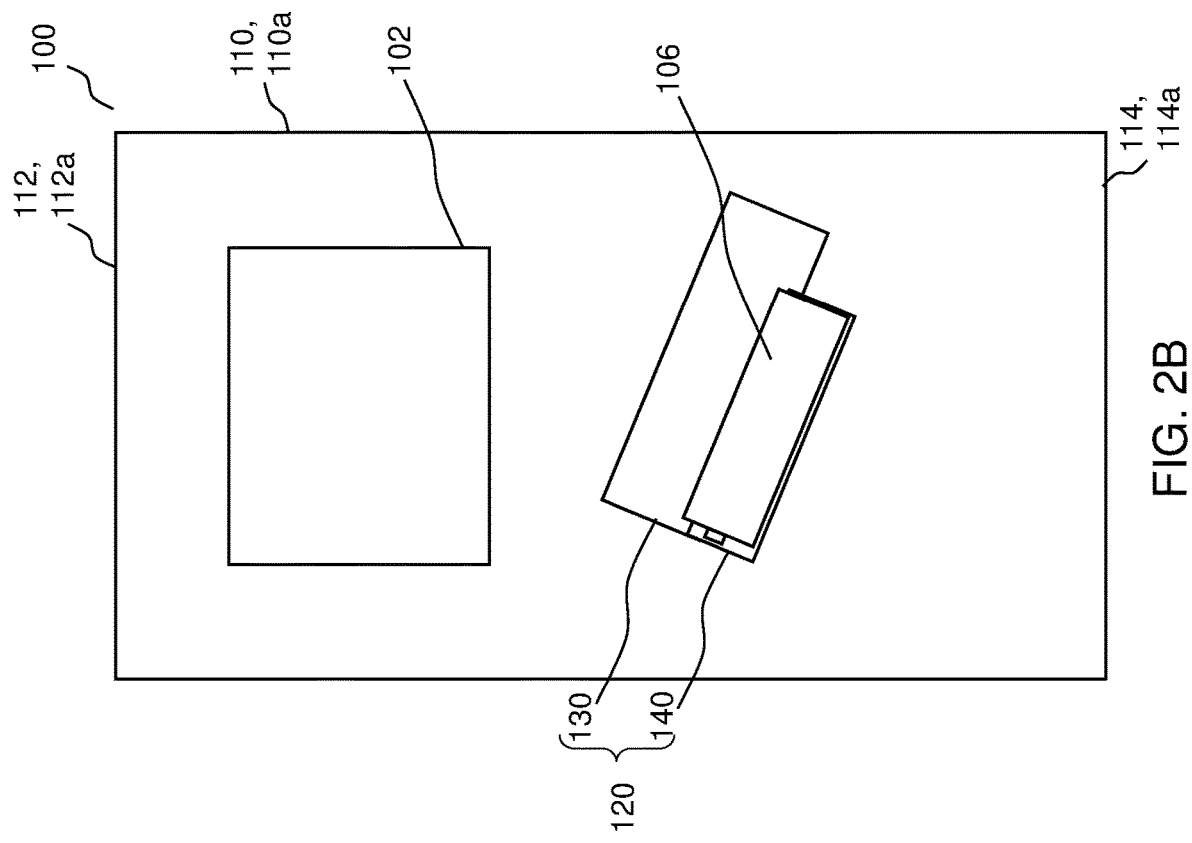

BATTERY-OPERATED HANDHELD DEVICE

TECHNICAL FIELD

Various embodiments generally relate to a battery-operated handheld device. In particular, various embodiments generally relate to a single handed handheld device.

BACKGROUND

A handheld device includes, but not limited to, a computer mouse, a remote controller, a remote controller gamepad, or a virtual reality (VR) controller. Most of these handheld devices are configured for single handed usage. Accordingly, weight distribution is an important aspect of such single handed handheld device. However, due to different hand sizes as well as different wrist strength which vary between different users, the handheld device may not be suitable for every users. Further, the usage requirements may also be different for different usage scenarios and/or applications which may require different weight distribution. Accordingly, user has to find handheld devices that are suitable for their hand sizes and wrist strength, and may also have to own multiple handheld devices to meet the different usage requirements.

Accordingly, there is a need to provide a handheld device that provides a simpler and more versatile solution.

SUMMARY

According to various embodiments, there is provided a battery-operated handheld device. The battery-operated handheld device may include a housing to enclose electrical components of the handheld device. The housing may have a front region and a rear region, whereby the front region is directed away from a user and the rear region is directed towards the user when the handheld device is in use while being held in a hand of the user. The battery-operated handheld device may include a battery holder disposed within the housing. The battery holder may include a first battery slot and a second battery slot. The first battery slot may be sized to hold a first battery of a first battery size. The second battery slot may be alongside the first battery slot so as to be in a side-by-side arrangement with the first battery slot. The second battery slot may be sized to hold a second battery of a second battery size. The second battery size may be different from the first battery size. The electrical components of the handheld device may be powered by either the first battery of the first battery size inserted into the first battery slot of the battery holder or the second battery of the second battery size inserted into the second battery slot of the battery holder. The battery holder may be disposed in a manner so as to serve as an adjustable weight distribution mechanism to shift a centre of gravity of the handheld device between a first predetermined centre of gravity associated with the first battery of the first battery size inserted into the first battery slot of the battery holder and a second predetermined centre of gravity associated with the second battery of the second battery size inserted into the second battery slot of the battery holder. The second predetermined centre of gravity may be rearward of the first predetermined centre of gravity with respect to the front region and the rear region of the housing.

According to various embodiments, there is provided a battery-operated handheld device. The battery-operated handheld device may include an elongated housing to enclose electrical components of the handheld device. The elongated housing may have a longitudinal front end portion and a longitudinal rear end portion. The longitudinal front end portion and the longitudinal rear end portion may be two opposite longitudinal end portions of the elongate housing. The battery-operated handheld device may include a battery holder disposed within the elongated housing. The battery holder may include a first battery slot and a second battery slot. The first battery slot may be sized to hold a first battery of a first battery size. The second battery slot may be alongside the first battery slot so as to be in a side-by-side arrangement with the first battery slot. The second battery slot may be sized to hold a second battery of a second battery size. The second battery size being different from the first battery size. The electrical components of the handheld device may be powered by either the first battery of the first battery size inserted into the first battery slot of the battery holder or the second battery of the second battery size inserted into the second battery slot of the battery holder. The battery holder may be disposed in a manner so as to serve as an adjustable weight distribution mechanism to shift a centre of gravity of the handheld device between a first predetermined centre of gravity associated with the first battery of the first battery size inserted into the first battery slot of the battery holder and a second predetermined centre of gravity associated with the second battery of the second battery size inserted into the second battery slot of the battery holder. The second predetermined centre of gravity may be rearward of the first predetermined centre of gravity with respect to the longitudinal front end portion and the longitudinal rear end portion of the elongated housing.

According to various embodiments, there is provided a battery-operated computer mouse. The battery-operated computer mouse may include a housing to enclose electrical components of the computer mouse. The housing may have a rear palm-rest region and a front region opposite the rear palm-rest region. The battery-operated computer mouse may include a battery holder disposed within the housing. The battery holder may include a first battery slot and a second battery slot. The first battery slot may be sized to hold a first battery of a first battery size. The second battery slot may be alongside the first battery slot so as to be in a side-by-side arrangement with the first battery slot. The second battery slot may be sized to hold a second battery of a second battery size. The second battery size may be different from the first battery size. The electrical components of the computer mouse may be powered by either the first battery of the first battery size inserted into the first battery slot of the battery holder or the second battery of the second battery size inserted into the second battery slot of the battery holder. The battery holder may be disposed in a manner so as to serve as an adjustable weight distribution mechanism to shift a centre of gravity of the computer mouse between a first predetermined centre of gravity associated with the first battery of the first battery size inserted into the first battery slot of the battery holder and a second predetermined centre of gravity associated with the second battery of the second battery size inserted into the second battery slot of the battery holder. The second predetermined centre of gravity may be rearward of the first predetermined centre of gravity with respect to the front region and the rear palm-rest region of the housing.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 2A shows a schematic diagram of the battery-operated handheld device of FIG. 1 with a first battery fitted into a first battery slot of a battery holder of the battery-operated handheld device of FIG. 1 according to various embodiments;

FIG. 2B shows a schematic diagram of the battery-operated handheld device 100 of FIG. 1 with a second battery fitted into a second battery slot of a battery holder of the battery-operated handheld device 100 of FIG. 1 according to various embodiments;

DETAILED DESCRIPTION

Figure 1:
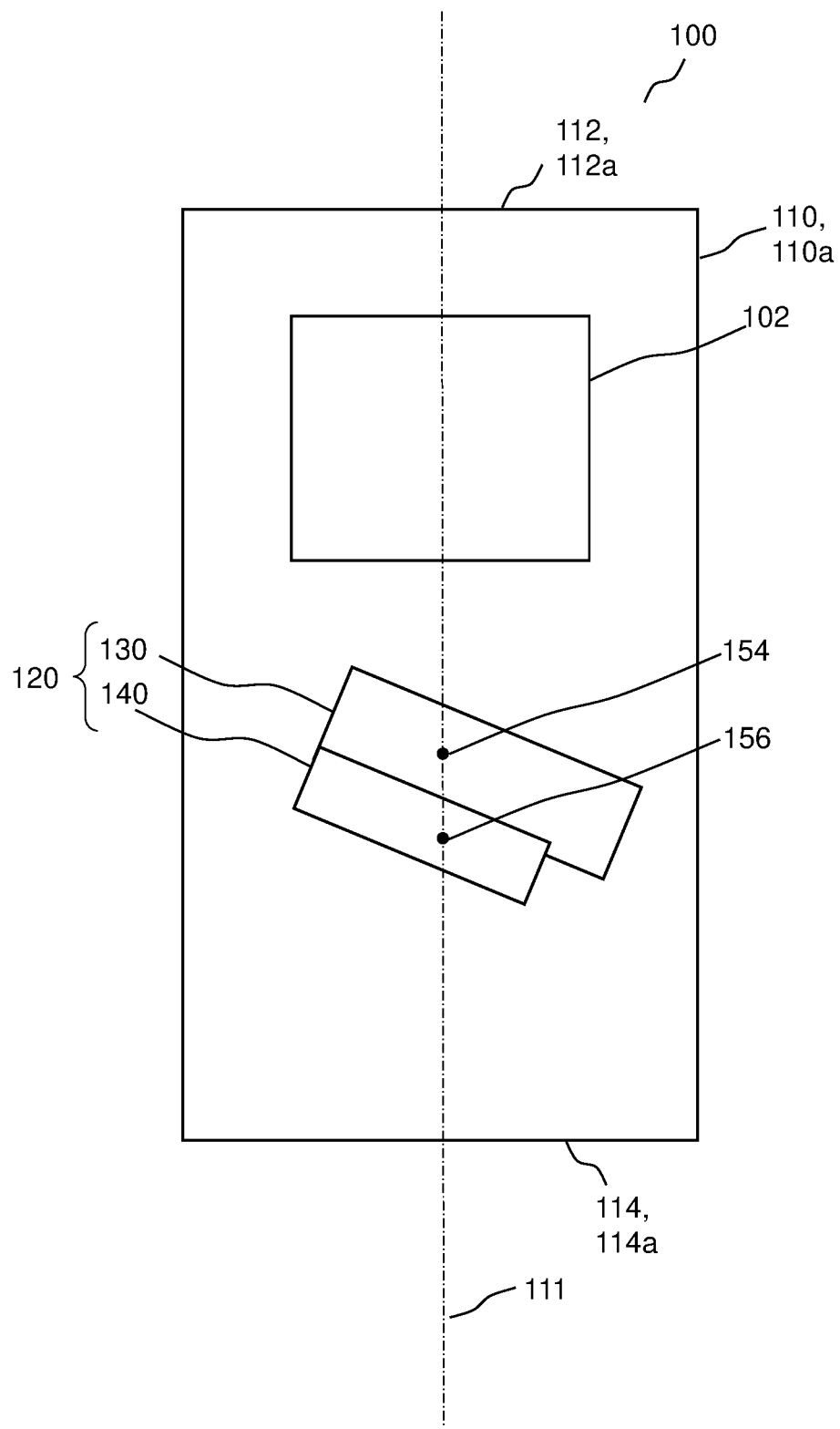
FIG. 1 shows a schematic diagram of a battery-operated handheld device according to various embodiments.

Embodiments described below in context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments generally relate to a battery-operated handheld device. In particular, various embodiments generally relate to a battery-operated single handed handheld device. Accordingly, various embodiments may be related to a standalone battery-operated handheld device. Further, the standalone battery-operated handheld device may be used with one hand. According to various embodiments, the battery-operated handheld device may include, but not limited to, a computer mouse, a remote controller, a remote controller gamepad, or a virtual reality (VR) controller.

According to various embodiments, the battery-operated handheld device may be configured with customizable weight distribution. Accordingly, the user may adjust or customize or vary a weight distribution of the battery-operated handheld device so as to customize the battery-operated handheld device for their hand sizes and wrist strength, as well as the different usage scenarios and/or requirements. According to various embodiments, the battery-operated handheld device may be powered by only one single battery, and may be configured to accept different batteries of different battery sizes (for example, AA and AAA, or a cylindrical battery and a button cell) so as to adjust or customize or vary the weight distribution of the battery-operated handheld device. Accordingly, in addition to customizing or varying weight distribution, the user may also have the flexibility of using different battery sizes at their disposal. Hence, the user may have the option to use smaller battery to reduce the overall weight of the device or to use larger battery if battery life is more important. According to various embodiments, batteries of different battery sizes may differ in terms of dimensions and/or shape. While AA and AAA size batteries are described as examples for convenience in the rest of the description, it is understood that the different battery sizes may include, but not limited to, cylindrical battery of A size or AA size or AAA size or AAAA size or B size or C size or D size or F size or N size or All size or A23 size or A27 size or BA5800 size, or rectangular battery of 4.5-volt size or 9-volt size or 6-volt size, or button cell of various sizes, or pouch battery of various sizes. According to various embodiments, the battery-operated handheld device may be configured to ensure that the weight distribution remain optimal when any one of the different batteries with different battery sizes is used. Accordingly, the battery-operated handheld device may provide flexibility of using different batteries depending on availability, as well as a choice of using different batteries for adjusting or customizing or varying the weight distribution of the batter-operated handheld device. For example, the weight distribution of the battery-operated handheld device may be varied in terms of being lighter or heavier, and/or shifting of centre of gravity.

According to various embodiments, the battery-operated handheld device may be configured with customizable weight distribution by inserting batteries of different battery sizes into different battery slots. For example, the battery-operated handheld device may include a battery holder or compartment having at least two side-by-side battery slots, wherein a first battery slot may hold a first battery of a first battery size (e.g. AA) and a second battery slot may hold a second battery of a second battery size (e.g. AAA). According to various embodiments, the battery-operated handheld device may include a cover for concealing the battery holder or compartment, the cover may include a stopper rib (or a protrusion) disposed underneath the cover such that the stopper rib may be directed towards the battery when the cover is placed over the battery holder or compartment. Accordingly, the stopper rib may prevent the battery from being displaced or dislodged from the battery holder or compartment such that the stopper rib may stabilize the battery when the battery-operated handheld device is moved vigorously during used. According to various embodiments, the battery holder or compartment may be configured to hold only one type of battery at any time. In other words, when the first battery of the first battery size is inserted into the battery holder or compartment, the second battery of the second battery size may not be inserted. Hence, when the battery holder or compartment have only two battery slots for different batteries, only one battery may be inserted into the battery holder or compartment at any time. Accordingly, batteries of different battery sizes may not be fitted into the batter holder or compartment at the same time. According to various embodiments, the battery-operated handheld device may be configured such that a centre of gravity of the battery-operated handheld device without batteries and a centre of gravity of the battery-operated handheld device with the first battery inserted may align or coincide with each other. Accordingly, when the second battery is inserted into the second battery slot of the battery holder or compartment and with the first battery removed, the centre of gravity of the battery-operated handheld device may be shifted.

The following examples pertain to various embodiments.

Example 1 is a battery-operated handheld device including:
- a housing to enclose electrical components of the handheld device, the housing having a front region and a rear region, whereby the front region is directed away from a user and the rear region is directed towards the user when the handheld device is in use while being held in a hand of the user; and
- a battery holder disposed within the housing, the battery holder comprising
  - a first battery slot sized to hold a first battery of a first battery size, and
  - a second battery slot alongside the first battery slot so as to be in a side-by-side arrangement with the first battery slot, the second battery slot sized to hold a second battery of a second battery size, the second battery size being different from the first battery size,
- wherein the electrical components of the handheld device are powered by either the first battery of the first battery size inserted into the first battery slot of the battery holder or the second battery of the second battery size inserted into the second battery slot of the battery holder,
- wherein the battery holder is disposed in a manner so as to serve as an adjustable weight distribution mechanism to shift a centre of gravity of the handheld device between a first predetermined centre of gravity associated with the first battery of the first battery size inserted into the first battery slot of the battery holder and a second predetermined centre of gravity associated with the second battery of the second battery size inserted into the second battery slot of the battery holder, wherein the second predetermined centre of gravity is rearward of the first predetermined centre of gravity with respect to the front region and the rear region of the housing.

In Example 2, the subject matter of Example 1 may optionally include that the first predetermined centre of gravity associated with the first battery of the first battery size inserted into the first battery slot of the battery holder may be aligned to a battery-free centre of gravity of the handheld device.

In Example 3, the subject matter of Example 1 or 2 may optionally include that the battery holder may be disposed within the housing in a manner such that each of the first battery slot and the second battery slot may be non-parallel with a front-and-rear centreline extending perpendicularly between the front region and the rear region of the housing.

In Example 4, the subject matter of Example 3 may optionally include that the first predetermined centre of gravity associated with the first battery of the first battery size inserted into the first battery slot of the battery holder and the second predetermined centre of gravity associated with the second battery of the second battery size inserted into the second battery slot of the battery holder may be along the front-and-rear centreline.

In Example 5, the subject matter of Example 3 or 4 may optionally include that each of the first battery slot and the second battery slot may be oriented diagonally with respect to the front-and-rear centreline.

In Example 6, the subject matter of any one of Examples 1 to 5 may optionally include that a width of the first battery slot of the battery holder may be smaller than a width of the first battery and a width of the second battery slot of the battery holder may be smaller than a width of the second battery in a manner so as to prevent the first battery slot receiving the first battery simultaneously with the second battery slot receiving the second battery.

In Example 7, the subject matter of any one of Examples 1 to 6 may optionally include that the housing may include a cover part removably placed over the battery holder to conceal the battery holder, wherein the cover part may include a protrusion extending towards the battery holder, the protrusion serving as a retainer to prevent the first battery or the second battery from displacing out of the first battery slot or the second battery slot respectively.

In Example 8, the subject matter of any one of Examples 1 to 7 may optionally include that the first battery slot may include a first pair of opposing support walls for respectively engaging a cap and a base of the first battery so as to hold the first battery therebetween, wherein the first pair of opposing support walls may be spaced apart by a first predetermined distance so as to be sized to hold the first battery, and the second battery slot may include a second pair of opposing support walls for respectively engaging against a cap and a base of the second battery so as to hold the second battery therebetween, wherein the second pair of opposing support walls may be spaced apart by a second predetermined distance so as to be sized to hold the second battery, and wherein the second predetermined distance may be different from the first predetermined distance.

In Example 9, the subject matter of Example 8 may optionally include that the second predetermined distance may be shorter than the first predetermined distance.

In Example 10, the subject matter of Example 8 or 9 may optionally include that a first wall of each of the first and second pair of opposing support walls may include a tab and a second wall of each of the first and second pair of opposing support walls may include a spring such that the tab and the spring may respectively press against the cap and the base of the first battery or the second battery.

Example 11 is a battery-operated handheld device including
- an elongated housing to enclose electrical components of the handheld device, the elongated housing having a longitudinal front end portion and a longitudinal rear end portion, wherein the longitudinal front end portion and the longitudinal rear end portion are two opposite longitudinal end portions of the elongate housing; and
- a battery holder disposed within the elongated housing, the battery holder comprising a first battery slot sized to hold a first battery of a first battery size, and a second battery slot alongside the first battery slot so as to be in a side-by-side arrangement with the first battery slot, the second battery slot sized to hold a second battery of a second battery size, the second battery size being different from the first battery size, wherein the electrical components of the handheld device are powered by either the first battery of the first battery size inserted into the first battery slot of the battery holder or the second battery of the second battery size inserted into the second battery slot of the battery holder, wherein the battery holder is disposed in a manner so as to serve as an adjustable weight distribution mechanism to shift a centre of gravity of the handheld device between a first predetermined centre of gravity associated with the first battery of the first battery size inserted into the first battery slot of the battery holder and a second predetermined centre of gravity associated with the second battery of the second battery size inserted into the second battery slot of the battery holder, wherein the second predetermined centre of gravity is rearward of the first predetermined centre of gravity with respect to the longitudinal front end portion and the longitudinal rear end portion of the elongated housing.

In Example 12, the subject matter of Example 11 may optionally include that the first predetermined centre of gravity associated with the first battery of the first battery size inserted into the first battery slot of the battery holder may be aligned to a battery-free centre of gravity of the handheld device.

In Example 13, the subject matter of Example 11 or 12 may optionally include that the battery holder may be disposed within the housing in a manner such that each of the first battery slot and the second battery slot may be non-parallel with a front-and-rear centreline extending perpendicularly between the longitudinal front end portion and the longitudinal rear end portion of the housing.

In Example 14, the subject matter of Example 13 may optionally include that the first predetermined centre of gravity associated with the first battery of the first battery size inserted into the first battery slot of the battery holder and the second predetermined centre of gravity associated with the second battery of the second battery size inserted into the second battery slot of the battery holder may be along the front-and-rear centreline.

In Example 15, the subject matter of Example 13 or 14 may optionally include that each of the first battery slot and the second battery slot may be oriented diagonally with respect to the front-and-rear centreline.

In Example 16, the subject matter of any one of Examples 11 to 15 may optionally include that a width of the first battery slot of the battery holder may be smaller than a width of the first battery and a width of the second battery slot of the battery holder may be smaller than a width of the second battery in a manner so as to prevent the first battery slot receiving the first battery simultaneously with the second battery slot receiving the second battery.

In Example 17, the subject matter of any one of Examples 11 to 16 may optionally include that the housing may include a cover part removably placed over the battery holder to conceal the battery holder, wherein the cover part may include a protrusion extending towards the battery holder, the protrusion serving as a retainer to prevent the first battery or the second battery from displacing out of the first battery slot or the second battery slot respectively.

In Example 18, the subject matter of any one of Examples 11 to 17 may optionally include that the first battery slot may include a first pair of opposing support walls for respectively engaging a cap and a base of the first battery so as to hold the first battery therebetween, wherein the first pair of opposing support walls may be spaced apart by a first predetermined distance so as to be sized to hold the first battery, and the second battery slot may include a second pair of opposing support walls for respectively engaging against a cap and a base of the second battery so as to hold the second battery therebetween, wherein the second pair of opposing support walls may be spaced apart by a second predetermined distance so as to be sized to hold the second battery, and wherein the second predetermined distance may be different from the first predetermined distance.

In Example 19, the subject matter of Example 18 may optionally include that the second predetermined distance may be shorter than the first predetermined distance.

In Example 20, the subject matter of Example 18 or 19 may optionally include that a first wall of each of the first and second pair of opposing support walls may include a tab and a second wall of each of the first and second pair of opposing support walls may include a spring such that the tab and the spring may respectively press against the cap and the base of the first battery or the second battery.

Example 21 is a battery-operated computer mouse including a housing to enclose electrical components of the computer mouse, the housing having a rear palm-rest region and a front region opposite the rear palm-rest region; and a battery holder disposed within the housing, the battery holder comprising a first battery slot sized to hold a first battery of a first battery size, and a second battery slot alongside the first battery slot so as to be in a side-by-side arrangement with the first battery slot, the second battery slot sized to hold a second battery of a second battery size, the second battery size being different from the first battery size, wherein the electrical components of the computer mouse are powered by either the first battery of the first battery size inserted into the first battery slot of the battery holder or the second battery of the second battery size inserted into the second battery slot of the battery holder, wherein the battery holder is disposed in a manner so as to serve as an adjustable weight distribution mechanism to shift a centre of gravity of the computer mouse between a first predetermined centre of gravity associated with the first battery of the first battery size inserted into the first battery slot of the battery holder and a second predetermined centre of gravity associated with the second battery of the second battery size inserted into the second battery slot of the battery holder, wherein the second predetermined centre of gravity is rearward of the first predetermined centre of gravity with respect to the front region and the rear palm-rest region of the housing.

In Example 22, the subject matter of Example 21 may optionally include that the first predetermined centre of gravity associated with the first battery of the first battery size inserted into the first battery slot of the battery holder may be aligned to a battery-free centre of gravity of the computer mouse.

In Example 23, the subject matter of Example 21 or 22 may optionally include that the battery holder may be disposed within the housing in a manner such that each of the first battery slot and the second battery slot is non-parallel with a front-and-rear centreline extending perpendicularly between the front region and the rear palm-rest region of the housing.

In Example 24, the subject matter of Example 23 may optionally include that the first predetermined centre of gravity associated with the first battery of the first battery size inserted into the first battery slot of the battery holder and the second predetermined centre of gravity associated with the second battery of the second battery size inserted into the second battery slot of the battery holder may be along the front-and-rear centreline.

In Example 25, the subject matter of Example 23 or 24 may optionally include that each of the first battery slot and the second battery slot may be oriented diagonally with respect to the front-and-rear centreline.

In Example 26, the subject matter of any one of Examples 21 to 25 may optionally include that a width of the first battery slot of the battery holder may be smaller than a width of the first battery and a width of the second battery slot of the battery holder may be smaller than a width of the second battery in a manner so as to prevent the first battery slot receiving the first battery simultaneously with the second battery slot receiving the second battery.

In Example 27, the subject matter of any one of Examples 21 to 26 may optionally include that the housing may include a cover part removably placed over the battery holder to conceal the battery holder, wherein the cover part may include a protrusion extending towards the battery holder, the protrusion serving as a retainer to prevent the first battery or the second battery from displacing out of the first battery slot or the second battery slot respectively.

In Example 28, the subject matter of Example 27 may optionally include that the cover part may be an upper part of the housing and the battery holder may be fixedly coupled to or integral with a base part of the housing.

In Example 29, the subject matter of Example 27 or 28 may optionally include that the protrusion may include a free-end having an end face with a first portion suspended above the first battery slot and a second portion suspended above the second battery slot, wherein the first portion has a profile corresponding to the first battery and the second portion has a profile corresponding to the second battery.

In Example 30, the subject matter of any one of Examples 21 to 29 may optionally include that the battery holder may include a dongle socket to hold a dongle for the computer mouse, the dongle socket being adjacent the second battery slot such that the second battery slot is between the first battery slot and the dongle socket.

In Example 31, the subject matter of any one of Examples 21 to 30 may optionally include that the first battery slot may include a first pair of opposing support walls for respectively engaging a cap and a base of the first battery so as to hold the first battery therebetween, wherein the first pair of opposing support walls may be spaced apart by a first predetermined distance so as to be sized to hold the first battery, and the second battery slot may include a second pair of opposing support walls for respectively engaging against a cap and a base of the second battery so as to hold the second battery therebetween, wherein the second pair of opposing support walls may be spaced apart by a second predetermined distance so as to be sized to hold the second battery, the second predetermined distance being different from the first predetermined distance.

In Example 32, the subject matter of Example 31 may optionally include that the second predetermined distance may be shorter than the first predetermined distance.

In Example 33, the subject matter of Example 31 or 32 may optionally include that a first wall of each of the first and second pair of opposing support walls may include a tab and a second wall of each of the first and second pair of opposing support walls may include a spring such that the tab and the spring may respectively press against the cap and a base of the first battery or the second battery.

In Example 34, the subject matter of any one of Examples 31 to 33 may optionally include that the first wall of the first pair of opposing support walls of the first battery slot and the first wall of the second pair of opposing walls of the second battery slot may be aligned.

FIG. 1 shows a schematic diagram of a battery-operated handheld device 100 according to various embodiments. According to various embodiments, the battery-operated handheld device 100 may include a housing 110. The housing 110 may be an exterior casing of the battery-operated handheld device 100. According to various embodiments, the housing 110 may define an inner cavity to house or encase or enclose electrical components 102 of the battery-operated handheld device 100. According to various embodiments, the electrical components 102 of the battery-operated handheld device 100 may include, but not limited to, one or a combination of a circuit board, integrated circuits, electronic components, sensors, detectors, receivers, transmitters, switches, processors, display, or memory. The electrical components 102 of the battery-operated handheld device 100 may be configured for performing the functions of the battery-operated handheld device 100.

According to various embodiments, the housing 110 of the battery-operated handheld device 100 may include a front region 112 and a rear region 114. According to various embodiments, the front region 112 may be directed away from a user and the rear region 114 may be directed towards the user when the battery-operated handheld device 100 is in use while being held in a hand of the user. For example, when the battery-operated handheld device 100 is a remote controller, a remote controller gamepad, or a virtual reality (VR) controller, the front region 112 of the battery-operated handheld device 100 may be a side or a face of the battery-operated handheld device 100 that is to be directed or pointed to a corresponding device or receiver. Accordingly, the rear region 114 of the battery-operated handheld device 100 may be opposite the front region 112 of the battery-operated handheld device 100. Hence, when the battery-operated handheld device 100 (in the form of a remote controller, a remote controller gamepad, or a virtual reality (VR) controller) is in use and is being held in the hand of the user, the user may direct or point the front region 112 of the battery-operated handheld device 100 to the corresponding device or receiver, while the rear region 114 of the battery-operated handheld device 100 may be directed or pointed to the user. As another example, when the battery-operated handheld device 100 is a computer mouse placed on a table, the rear region 114 of the battery-operated handheld device 100 may be received by a palm of the user with the user holding the battery-operated handheld device 100 such that the front region 112 of the battery-operated handheld device 100 may be directed or pointed away from the user. Accordingly, when the battery-operated handheld device 100 (in the form of a computer mouse) is in use and is being held in the hand of the user, the user may hold the battery-operated handheld device 100 with the front region 112 of the battery-operated handheld device 100 directed or pointed away from the user while the rear region 114 of the battery-operated handheld device 100 may be directed or pointed to the user.

According to various embodiments, the housing 110 of the battery-operated handheld device 100 may be an elongated housing 110a. According to various embodiments, the elongated housing 110a of the battery-operated handheld device 100 may include a longitudinal front end portion 112a and a longitudinal rear end portion 114a. The longitudinal front end portion 112a and the longitudinal rear end portion 114a may be two opposite longitudinal end portions of the elongate housing 110a. According to various embodiments, the longitudinal front end portion 112a may serve as the front region 112 of the battery-operated handheld device 100 and the longitudinal rear end portion 114a may serve as the rear region 114 of the battery-operated handheld device 100. Accordingly, the longitudinal front end portion 112a may be directed away from the user and the longitudinal rear end portion 114a may be directed towards the user when the battery-operated handheld device 100 is in use while being held in the hand of the user.

According to various embodiments, the battery-operated handheld device 100 may include a battery holder 120. According to various embodiments, the battery holder 120 may be disposed within the housing 110 or the elongated housing 110a. Accordingly, the battery holder 120 may be housed or encased or enclosed by the housing 110 or the elongated housing 110a.

According to various embodiments, the battery holder 120 of the battery-operated handheld device 100 may include at least two (or two or more) battery slots 130, 140 (or battery bays) for receiving at least two (or two or more) different types of batteries 104, 106 (see for example FIG. 2A and FIG. 2B). The different types of batteries 104, 106 may be of different battery sizes. For example, a first type of battery 104 may have a first battery size and a second type of battery 106 may have a second battery size, which is different from the first battery size. According to various embodiments, the first battery size and the second battery size may be any two different battery sizes, each including, but not limited to, cylindrical battery of A size or AA size or AAA size or AAAA size or B size or C size or D size or F size or N size or A11 size or A23 size or A27 size or BA5800 size, or rectangular battery of 4.5-volt size or 9-volt size or 6-volt size, or button cell of various sizes, or pouch battery of various sizes. According to various embodiments, the at least two battery slots 130, 140 of the battery holder 120 may be in a side-by-side arrangement. According to various embodiments, the electrical components 102 of the battery-operated handheld device 100 may be configured to be powered by one or more batteries of the same battery sizes. Accordingly, the electrical components 102 of the battery-operated handheld device 100 may be powered when one or more batteries of the first type is fitted into the battery holder 120 or when one or more batteries of the second type is fitted into the battery holder 120. According to various embodiments, when different types of batteries 104, 106 of different battery sizes are used in the battery-operated handheld device 100, a weight distribution of the battery-operated handheld device 100 may be changed or varied or altered or adjusted or customized. Accordingly, the user may selectively switch between using different types of batteries 104, 106 of different battery sizes to power up the battery-operated handheld device 100 so as to vary or adjust or customize the weight distribution of the battery-operated handheld device 100 depending on the hand sizes and wrist strength, as well as the different usage scenarios and/or requirements. For example, the user may flexibly switch between different types of batteries 104, 106 of different battery sizes to use smaller battery for reducing the overall weight of the handheld device 100 or to use larger battery if battery life is more important.

According to various embodiments, the battery holder 120 of the battery-operated handheld device 100 may include a first battery slot 130 (or first battery bay) and a second battery slot 140 (or second battery bay). According to various embodiments, each of the first battery slot 130 and the second battery slot 140 may be a channel or a groove or a narrow elongated depression. According to various embodiments, the first battery slot 130 may be sized to hold the first battery 104 of the first battery size. According to various embodiments, the second battery slot 140 may be sized to hold the second battery 106 of the second battery size. The first battery size and the second battery size may be different battery sizes. According to various embodiments, the second battery slot 140 may be alongside the first battery slot 130 so as to be in a side-by-side arrangement with the first battery slot 130. Accordingly, the first battery slot 130 and the second battery slot 140 may be parallel to each other, and may be immediately adjacent to each other such that the first battery slot 130 and the second battery slot 140 may be bordering each other.

According to various embodiments, the electrical components 102 of the battery-operated handheld device 100 may be powered by either the first battery 104 of the first battery size inserted into the first battery slot 130 of the battery holder 120, or the second battery 106 of the second battery size inserted into the second battery slot 140 of the battery holder 120. Accordingly, the electrical components 102 of the battery-operated handheld device 100 may be powered with only the first battery 104 of the first battery size inserted into the first battery slot 130 of the battery holder 120. The electrical components 102 of the battery-operated handheld device 100 may also be powered with only the second battery 106 of the second battery size inserted into the second battery slot 140 of the battery holder 120. Hence, the electrical components 102 of the battery-operated handheld device 100 may only require one of the first battery 104 or the second battery 106 to be fitted to the battery holder 120 to power the electrical components 102 of the battery-operated handheld device 100.

According to various embodiments, the battery holder 120 of the battery-operated handheld device 100 may be disposed in a manner so as to serve as an adjustable weight distribution mechanism to shift the centre of gravity of the battery-operated handheld device 100. Accordingly, by fitting the first battery 104 of the first battery size into the first battery slot 130 of the battery holder 120 or fitting the second battery 106 of the second battery size into the second battery slot 140 of the battery holder 120, the centre of gravity of the battery-operated handheld device 100 may be changed or varied or altered or adjusted or customized. Hence, by selectively fitting the first battery 104 or the second battery 106 to the battery holder 120 for powering the electrical components 102 of the battery-operated handheld device 100, the weight distribution of the battery-operated handheld device 100 may be changed or varied or altered or adjusted or customized so as to suit the user's hand sizes and/or wrist strength, as well as the different usage scenarios and/or requirements. Further, the battery holder 120 of the battery-operated handheld device 100 may also serve to provide flexibility of using different battery sizes at the user's disposal. For example, providing the user the options of using smaller battery for reducing the overall weight of the handheld device 100 or using larger battery if battery life is more important.

According to various embodiments, the battery holder 120 of the battery-operated handheld device 100 serving as the adjustable weight distribution mechanism may shift the centre of gravity of the battery-operated handheld device 100 between a first predetermined centre of gravity 154 associated with the first battery 104 of the first battery size inserted into the first battery slot 130 of the battery holder 120 and a second predetermined centre of gravity 156 associated with the second battery 106 of the second battery size inserted into the second battery slot 140 of the battery holder 120. According to various embodiments, the second predetermined centre of gravity 156 may be rearward of the first predetermined centre of gravity 154 with respect to the front region 112 and the rear region 114 of the housing 110 (or the longitudinal front end portion 112a and the longitudinal rear end portion 114a of the elongated housing 110a). Accordingly, the second predetermined centre of gravity 156 may be closer to the rear region 114 of the housing 110 (or the longitudinal rear end portion 114a of the elongated housing 110a). Hence, the first predetermined centre of gravity 154 may be closer to the front region 112 of the housing 110 (or the longitudinal front end portion 112a of the the elongated housing 110a) and may be forward of the second predetermined centre of gravity 156.

According to various embodiments, the battery holder 120 of the battery-operated handheld device 100 may be configured to serve as the adjustable weight distribution mechanism for switching the battery-operated handheld device 100 between different weight modes, including but not limited to, at least a balanced-weight mode and a rear-heavy mode, or a front-heavy mode and a balanced-weight mode, or a front-heavy mode and a rear-heavy mode. According to various embodiments, in the balanced-weight mode, the centre of gravity of the battery-operated handheld device 100 may be around a middle or centre of the battery-operated handheld device 100. According to various embodiments, in the front-heavy mode, the centre of gravity of the battery-operated handheld device 100 may be ahead of the middle or centre of the battery-operated handheld device 100 and towards the front region 112 of the housing 110 (or the longitudinal front end portion 112a of the elongated housing 110a). According to various embodiments, in the rear-heavy mode, the centre of gravity of the battery-operated handheld device 100 may be after the middle or centre of the battery-operated handheld device 100 and towards the rear region 114 of the housing 110 (or the longitudinal rear end portion 114a of the elongated housing 110a).

According to various embodiments, the first predetermined centre of gravity 154 associated with the first battery 104 of the first battery size inserted into the first battery slot 130 of the battery holder 120 may be aligned to a battery-free centre of gravity of the battery-operated handheld device 100. The battery-free centre of gravity of the battery-operated handheld device 100 may be the centre of gravity of the battery-operated handheld device 100 when no batteries are inserted or fitted to the battery holder 120. In order words, the battery-free centre of gravity of the battery-operated handheld device 100 may be the centre of gravity of the battery-operated handheld device 100 when unladen or not loaded with batteries. Accordingly, the first predetermined centre of gravity 154 associated with the first battery 104 of the first battery size inserted into the first battery slot 130 of the battery holder 120 and the battery-free centre of gravity of the battery-operated handheld device 100 may coincide. Hence, the centre of gravity of the battery-operated handheld device 100 may not shift forward or rearward with respect to the front region 112 and the rear region 114 of the housing 110 (or the longitudinal front end portion 112a and the longitudinal rear end portion 114a of the elongated housing 110a) regardless of whether the first battery 104 is inserted into the first battery slot 130 of the battery holder 120.

According to various embodiments, the first battery slot 130 of the battery holder 120 may correspond to the first predetermined centre of gravity 154 of the battery-operated handheld device 100. Accordingly, the first battery slot 130 of the battery holder 120 may serve as a visual indicator for a location of the first predetermined centre of gravity 154 of the battery-operated handheld device 100. For example, a centre of the first battery slot 130 of the battery holder 120 may be aligned to or may coincide with the first predetermined centre of gravity 154 of the battery-operated handheld device 100. Hence, the centre of the first battery slot 130 of the battery holder 120 may provide a visual reference for the location of the first predetermined centre of gravity 154 of the battery-operated handheld device 100.

According to various embodiments, the second battery slot 140 of the battery holder 120 may correspond to the second predetermined centre of gravity 156 of the battery-operated handheld device 100. Accordingly, the second battery slot 140 of the battery holder 120 may serve as a visual indicator for a location of the second predetermined centre of gravity 156 of the battery-operated handheld device 100. For example, a centre of the second battery slot 140 of the battery holder 120 may be aligned to or may coincide with the second predetermined centre of gravity 156 of the battery-operated handheld device 100. Hence, the centre of the second battery slot 140 of the battery holder 120 may provide a visual reference for the location of the second predetermined centre of gravity 156 of the battery-operated handheld device 100.

According to various embodiments, the battery holder 120 may be disposed within the housing 110 (or the elongated housing 110a) in a manner such that each of the first battery slot 130 and the second battery slot 140 may be non-parallel with a front-and-rear centreline 111 extending perpendicularly between the front region 112 and the rear region 114 of the housing 110 (or the longitudinal front end portion 112a and the longitudinal rear end portion 114a of the elongated housing 110a). The front-and-rear centreline 111 may run through a centre of the housing 110 (or the elongated housing 110a) from the front region 112 to the rear region 114 (or from the longitudinal front end portion 112a to the longitudinal rear end portion 114a) so as to divide the housing 110 (or the elongated housing 110a) into two equal lateral portions. Accordingly, a slot axis of the first battery slot 130 may be at an angle or slanted with respect to the front-and-rear centreline 111. Similarly, a slot axis of the second battery slot 140 may be at an angle or slanted with respect to the front-and-rear centreline 111. According to various embodiments, each of the first battery slot 130 and the second battery slot 140 may intersect the front-and-rear centreline 111 at an angle. For example, each of the first battery slot 130 and the second battery slot 140 may intersect the front-and-rear centreline 111 diagonally or transversely. Accordingly, each of the first battery slot 130 and the second battery slot 140 may be oriented diagonally or transversely with respect to the front-and-rear centreline 111.

According to various embodiments, the first predetermined centre of gravity 154 associated with the first battery 104 of the first battery size inserted into the first battery slot 130 of the battery holder 120 and the second predetermined centre of gravity 156 associated with the second battery 106 of the second battery size inserted into the second battery slot 140 of the battery holder 120 may be along the front-and-rear centreline 111. Accordingly, each of first predetermined centre of gravity 154 and the second predetermined centre of gravity 156 may lie on the front-and-rear centreline 111 and be spaced apart from each other. Hence, by selectively fitting the first battery 104 or the second battery 106 to the battery holder 120, the weight distribution of the battery-operated handheld device 100 may be switched between the first predetermined centre of gravity 154 and the second predetermined centre of gravity 156 along the front-and-rear centreline 111.

According to various embodiments, the first predetermined centre of gravity 154 associated with the first battery 104 of the first battery size inserted into the first battery slot 130 of the battery holder 120 and the second predetermined centre of gravity 156 associated with the second battery 106 of the second battery size inserted into the second battery slot 140 of the battery holder 120 may be laterally offset from the front-and-rear centreline 111. Accordingly, each of first predetermined centre of gravity 154 and the second predetermined centre of gravity 156 may not lie on the front-and-rear centreline 111. According to various embodiments, the first predetermined centre of gravity 154 and the second predetermined centre of gravity 156 may be laterally offset to a same side from the front-and-rear centreline 111. According to various embodiments, the first predetermined centre of gravity 154 and the second predetermined centre of gravity 156 may be laterally offset to opposite sides from the front-and-rear centreline 111. According to various embodiments, one of the first predetermined centre of gravity 154 and the second predetermined centre of gravity 156 may be along the front-and-rear centreline 111 while another one of the first predetermined centre of gravity 154 and the second predetermined centre of gravity 156 may be laterally offset from the front-and-rear centreline 111. However, regardless of whether the first predetermined centre of gravity 154 and the second predetermined centre of gravity 156 is along the front-and-rear centreline 111 or laterally offset from the front-and-rear centreline 111, the second predetermined centre of gravity 156 may still be spaced rearward from the first predetermined centre of gravity 154 with respect to the with respect to the front region 112 and the rear region 114 of the housing 110 (or the longitudinal front end portion 112a and the longitudinal rear end portion 114a of the elongated housing 110a).

FIG. 2A shows a schematic diagram of the battery-operated handheld device 100 with the first battery 104 fitted into the first battery slot 130 of the battery holder 120 according to various embodiments. FIG. 2B shows a schematic diagram of the battery-operated handheld device 100 with the second battery 106 fitted into the second battery slot 140 of the battery holder 120 according to various embodiments. According to various embodiments, a width of the first battery slot 130 of the battery holder 120 may be smaller than a width of the first battery 104 and a width of the second battery slot 140 of the battery holder 120 may be smaller than a width of the second battery 106. According to various embodiments, when the first battery 104 is fitted to the first battery slot 130 of the battery holder 120, a side of the first battery 104 may protrude from a border of the first battery slot 130 so as to extend over or into the second battery slot 140 due to the width of the first battery 104 being wider than the width of the first battery slot 130. According to various embodiments, when the second battery 106 is fitted to the second battery slot 1430 of the battery holder 120, a side of the second battery 106 may protrude from a border of the second battery slot 140 so as to extend over or into the first battery slot 130 due to the width of the second battery 106 being wider than the width of the second battery slot 140. Accordingly, the battery holder 120 may prevent the first battery slot 130 receiving the first battery 104 simultaneously with the second battery slot 140 receiving the second battery 106. Hence, the battery holder 120 may not be fitted with the first battery 104 into the first battery slot 130 and the second battery 106 into the second battery slot 140 at the same time.

Figure 3A:
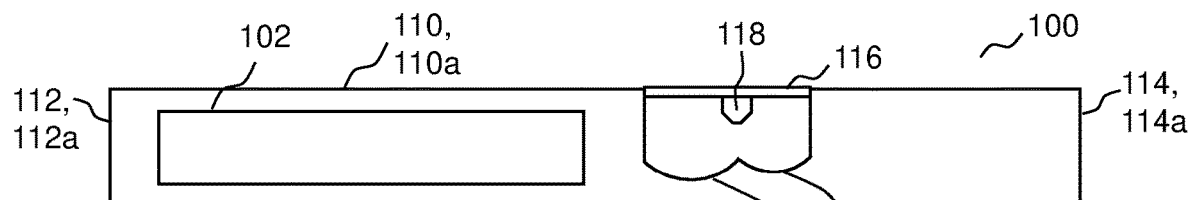
FIG. 3A and FIG. 3B show schematic cross-sectional diagrams of the battery-operated handheld device of FIG. 1 according to various embodiments.
Figure 3B:
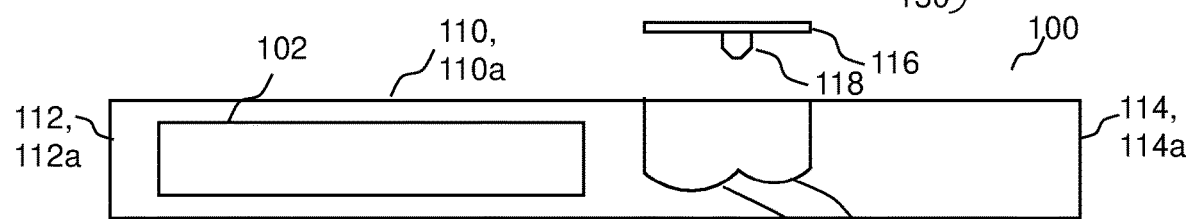

FIG. 3A and FIG. 3B show schematic cross-sectional diagrams of the battery-operated handheld device 100 according to various embodiments. According to various embodiments, the housing 110 (or the elongated housing 110a) may include a cover part 116. According to various embodiments, the cover part 116 may be removably placed over the battery holder 120 to conceal the battery holder 120. According to various embodiments, the cover part 116 may be removably attached to the rest of the housing 110 (or the elongated housing 110a), or may be removably attached to the battery holder 120, or may be removably attached to internal frame structures of the battery-operated handheld device 100.

According to various embodiments, the cover part 116 may include a protrusion 118. According to various embodiments, the protrusion 118 may extend from an underneath surface of the cover part 116. The underneath surface of the cover part 116 may be facing the battery holder 120 when the cover part 116 is placed over the battery holder 120. According to various embodiments, the protrusion 118 may be extending towards the battery holder 120. According to various embodiments, the protrusion 118 may serve as a retainer or a stopper rib to prevent the first battery 104 or the second battery 106 from displacing or dislodging out of the first battery slot 130 or the second battery slot 140 respectively. Accordingly, an end face of the protrusion 118 may be suspended above the first battery slot 130 and the second battery slot 140. Hence, when the first battery 104 is fitted into the first battery slot 130, a first portion of the end face of the protrusion 118 may be suspended above the first battery slot 130 so as to be loosely abutting the first battery 104. Similarly, when the second battery 106 is fitted into the second battery slot 140, a second portion of the end face of the protrusion 118 may be suspended above the second battery slot 140 so as to be loosely abutting the second battery 106. Thus, the first portion and the second portion of the end face of the protrusion 118 may respectively block or obstruct the first battery 104 or the second battery 106 from being displaced or dislodged out of the first battery slot 130 or the second battery slot 140 respectively.

Figure 4A:
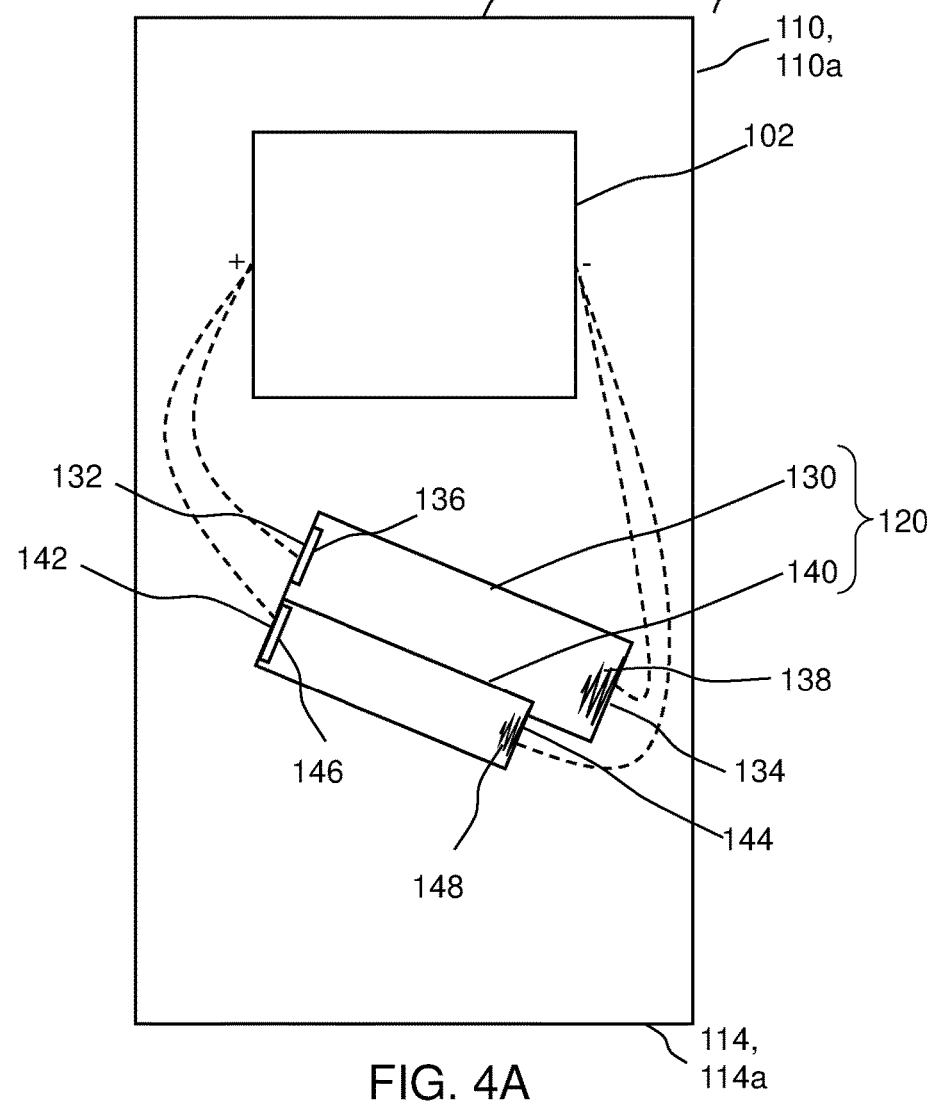
FIG. 4A shows a schematic diagram with further details of the battery holder of the battery-operated handheld device of FIG. 1 according to various embodiments.

FIG. 4A shows a schematic diagram with further details of the battery holder 120 of the battery-operated handheld device 100 according to various embodiments. According to various embodiments, the first battery slot 130 of the battery holder 120 may include a first pair of opposing support walls 132, 134 for respectively engaging a cap and a base of the first battery 104 (for example see FIG. 2A) so as to hold the first battery 104 therebetween. According to various embodiments, the first pair of opposing support walls 132, 134 may be at opposite longitudinal ends of the first battery slot 130 so as to define a length of the first battery slot 130. Accordingly, the first pair of opposing support walls 132, 134 may be spaced apart by a first predetermined distance, for defining the length of the first battery slot 130, so as to be sized to hold the first battery 104. Hence, the first predetermined distance may be equal or longer than a length of the first battery 104. According to various embodiments, the second battery slot 140 may include a second pair of opposing support walls 142, 144 for respectively engaging against a cap and a base of the second battery 106 (for example see FIG. 2B) so as to hold the second battery 106 therebetween. According to various embodiments, the second pair of opposing support walls 142, 144 may be at opposite longitudinal ends of the second battery slot 140 so as to define a length of the second battery slot 140. Accordingly, the second pair of opposing support walls 142, 144 may be spaced apart by a second predetermined distance, for defining the length of the second battery slot 140, so as to be sized to hold the second battery 106. Hence, the second predetermined distance may be equal or longer than a length of the second battery 106. According to various embodiments, the second predetermined distance may be different from the first predetermined distance since the first battery 104 and the second battery 106 are of different battery sizes. For example, the second predetermined distance may be shorter than the first predetermined distance when the first battery 104 is of a battery size (e.g. AA) that is longer than the second battery 106 of another battery size (e.g. AAA).

According to various embodiments, a first wall 132 of the first pair of opposing support walls of the first battery slot 130 may include a tab 136 and a second wall 134 of the first pair of opposing support walls of the first battery slot 130 may include a spring 138. According to various embodiments, the tab 136 and the spring 138 of the first battery slot 130 may respectively press against the cap and the base of the first battery 104 so as to cooperatively hold the first battery 104 in the first battery slot 130. According to various embodiments, the spring 138 may include, but not limited to, coil spring, conical spring, volute spring, flat spring, torsion spring, or disc spring. According to various embodiments, the tab 136 may be made of a conductive material for connecting a positive terminal of the first battery 104 at the cap of the first battery 104 to the electrical components 102 of the battery-operated handheld device 100. According to various embodiments, the spring 138 may be made of a conductive material for connecting a negative terminal of the first battery 104 at the base of the first battery 104 to the electrical components 102 of the battery-operated handheld device 100.

According to various embodiments, a first wall 142 of the second pair of opposing support walls of the second battery slot 140 may include a tab 146 and a second wall 144 of the second pair of opposing support walls of the second battery slot 140 may include a spring 148. According to various embodiments, the tab 146 and the spring 148 of the second battery slot 140 may respectively press against the cap and the base of the second battery 106 so as to cooperatively hold the second battery 106 in the second battery slot 140. According to various embodiments, the spring 148 may include, but not limited to, coil spring, conical spring, volute spring, flat spring, torsion spring, or disc spring. According to various embodiments, the tab 146 may be made of a conductive material for connecting a positive terminal of the second battery 106 at the cap of the second battery 106 to the electrical components 102 of the battery-operated handheld device 100. According to various embodiments, the spring 148 may be made of a conductive material for connecting a negative terminal of the second battery 106 at the base of the second battery 106 to the electrical components 102 of the battery-operated handheld device 100.

As shown in FIG. 4A, according to various embodiments, the tab 136 of the first battery slot 130 and the tab 146 of the second battery slot 140 may be independently connected to the electrical components 102 of the battery-operated handheld device 100, and the spring 138 of the first battery slot 130 and the spring 148 of the second battery slot 140 may be independently connected to the electrical components 102 of the battery-operated handheld device 100. Accordingly, inserting the first battery 104 into the first battery slot 130 may connect the positive terminal of the first battery 104 to the electrical components 102 via the tab 136 of the first battery slot 130, and may connect the negative terminal of the first battery 104 to the electrical components 102 via the spring 138 of the first battery slot 130. Similarly, inserting the second battery 106 into the second battery slot 140 may connect the positive terminal of the second battery 106 to the electrical components 102 via the tab 146 of the second battery slot 140, and may connect the negative terminal of the second battery 106 to the electrical components 102 via the spring 148 of the second battery slot 140. Hence, the electrical components 102 of the battery-operated handheld device 100 may be powered by selectively inserting the first battery 104 into the first battery slot 130 or the second battery 106 into the second battery slot 140.

Figure 4B:
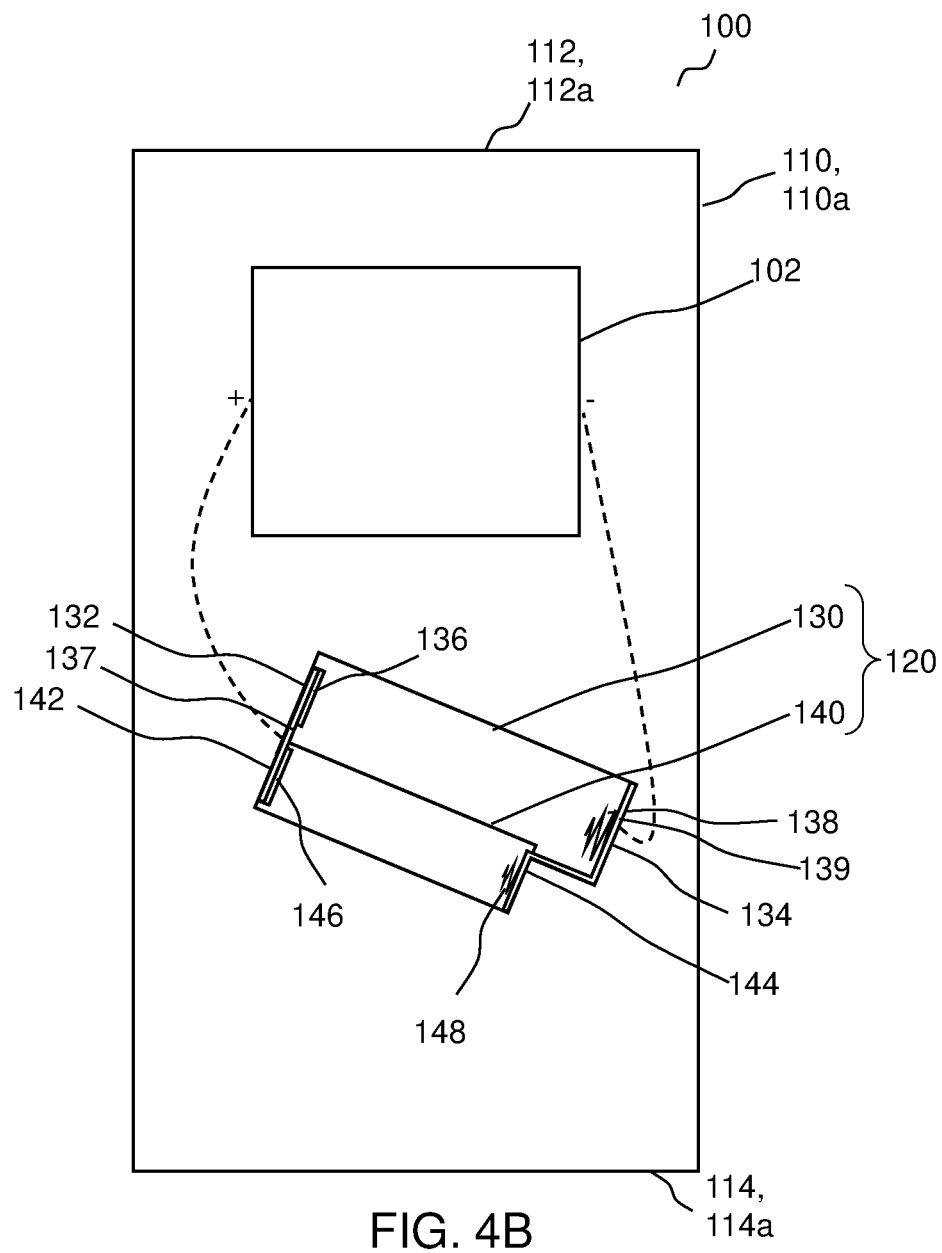
FIG. 4B shows a variation in a connection between the battery holder and the electrical components of the battery-operated handheld device of FIG. 1 according to various embodiments.

FIG. 4B shows a variation in a connection between the battery holder 120 and the electrical components 102 of the battery-operated handheld device 100. According to various embodiments, the tab 136 of the first battery slot 130 and the tab 146 of the second battery slot 140 may be interconnected. For example, the battery holder 120 may include a first conducting track 137 to interconnect the tab 136 of the first battery slot 130 and the tab 146 of the second battery slot 140. The first conducting track 137 may then be connected to the electrical components 102 of the battery-operated handheld device 100. According to various embodiments, the spring 138 of the first battery slot 130 and the spring 148 of the second battery slot 140 may be interconnected. For example, the battery holder 120 may include a second conducting track 139 to interconnect the spring 138 of the first battery slot 130 and the spring 148 of the second battery slot 140. The second conducting track 139 may then be connected to the electrical components 102 of the battery-operated handheld device 100. Accordingly, inserting the first battery 104 into the first battery slot 130 may connect the positive terminal of the first battery 104 to the electrical components 102 via the first conducting track 137 through the tab 136 of the first battery slot 130, and may connect the negative terminal of the first battery 104 to the electrical components 102 via the second conducting track 139 through the tab 146 of the second battery slot 140. Similarly, inserting the second battery 106 into the second battery slot 140 may connect the positive terminal of the second battery 106 to the electrical components 102 via the first conducting track 137 through the spring 138 of the first battery slot 130, and may connect the negative terminal of the second battery 106 to the electrical components 102 via the second conducting track 139 through the spring 148 of the second battery slot 140. Hence, the electrical components 102 of the battery-operated handheld device 100 may be powered by selectively inserting the first battery 104 into the first battery slot 130 or the second battery 106 into the second battery slot 140.

Figure 4C:
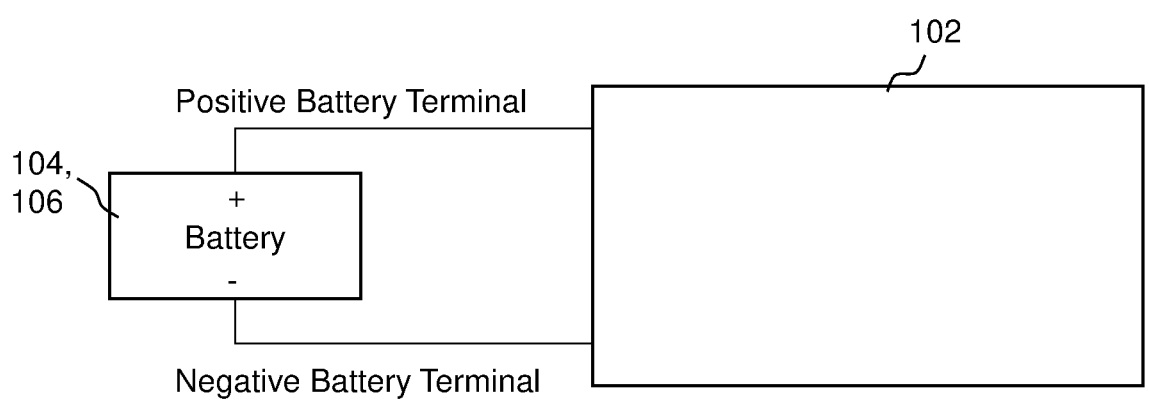
FIG. 4C shows a schematic diagram of a battery connected to electrical components of the battery-operated handheld device of FIG. 1 according to various embodiments.

FIG. 4C shows a schematic diagram of the first battery 104 or the second battery 106 connected to the electrical components 102 of the battery-operated handheld device 100 according to various embodiments. According to various embodiments, the electrical components 102 may include an overcurrent circuit at the connection between the electrical components 102 and the first battery 104 or the second battery 106 to protect against overcurrent. For example, the overcurrent circuit may include, but not limited to, a positive temperature coefficient (PTC) fuse. According to various embodiments, the electrical components 102 may include an overvoltage circuit at the connection between the electrical components 102 and the first battery 104 or the second battery 106 to protect against overvoltage. The overvoltage circuit may be configured to cutoff the supply when the input voltage exceeds a preset value or to regulate the input voltage such that it is always lesser than or equal to the preset value. For example, the overvoltage circuit may include, but not limited to, a Zener diode and a bipolar transistor. According to various embodiments, the electrical components 102 may include a battery reverse polarity protection circuit at the connection between the electrical components 102 and the first battery 104 or the second battery 106 to protect against the battery being inserted in reverse polarity. The battery reverse polarity protection circuit may be configured to prevent damage to the electrical components 102 when the battery polarity is reversed. For example, the battery reverse polarity protection circuit may include, but not limited to, a diode.

Figure 5A:
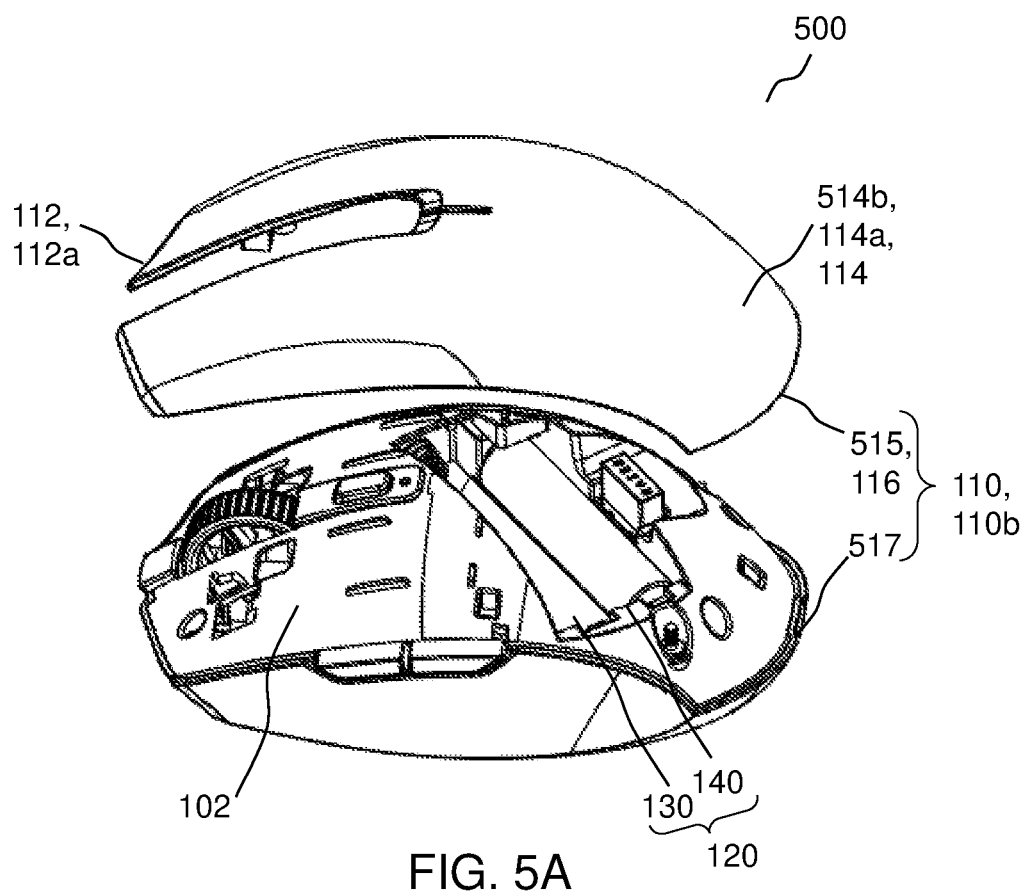
FIG. 5A and FIG. 5B shows different views of a computer mouse (or a battery-operated computer mouse), as an example of the battery-operated handheld device of FIG. 1, according to various embodiments.
Figure 5B:
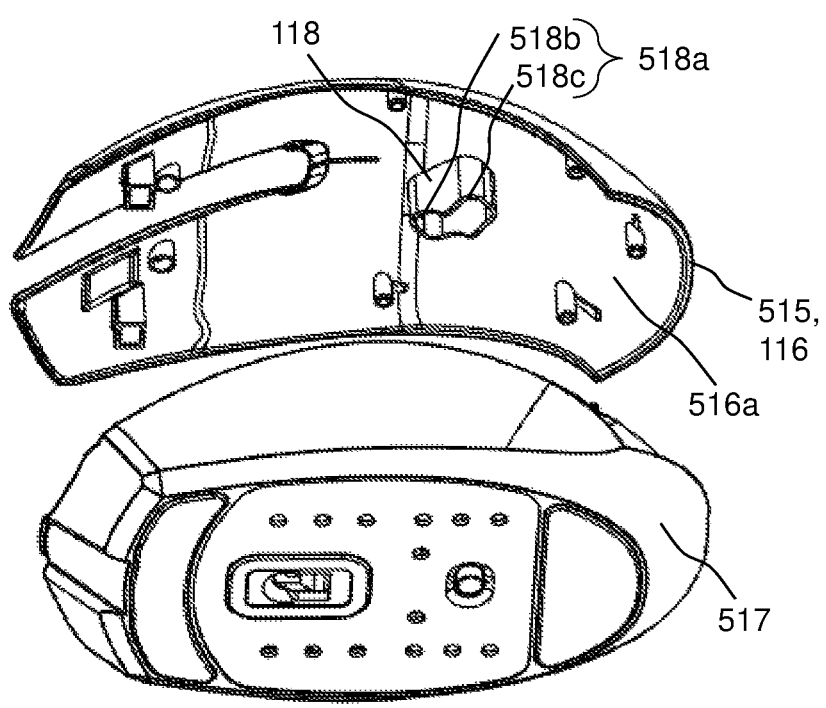
Figure 5C:
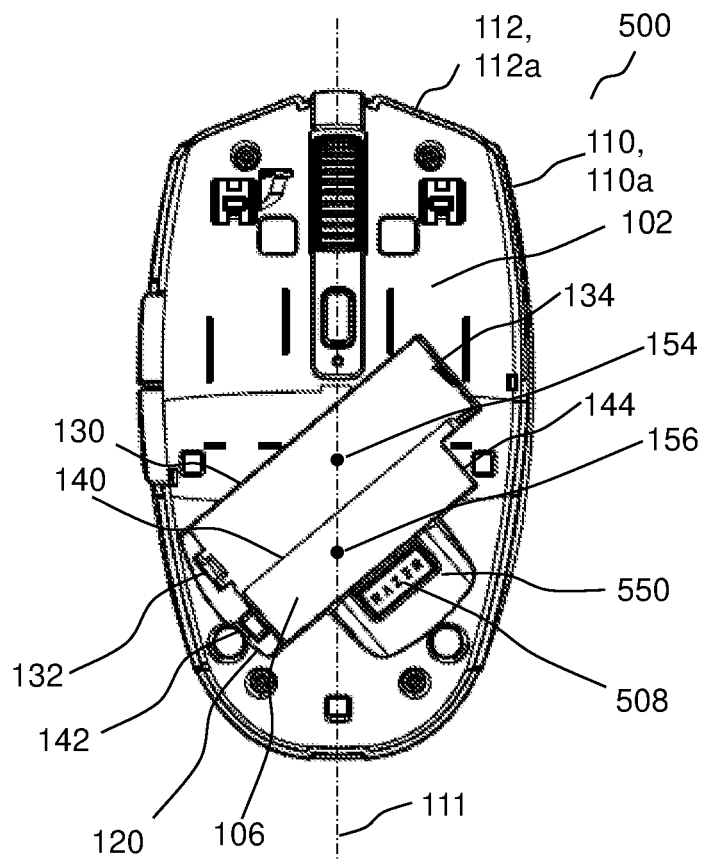
FIG. 5C shows a top view of the computer mouse of FIG. 5A and FIG. 5B without a cover part and with a second battery inserted into a second battery slot of a battery holder of the computer mouse of FIG. 5A and FIG. 5B according to various embodiments.
Figure 5D:
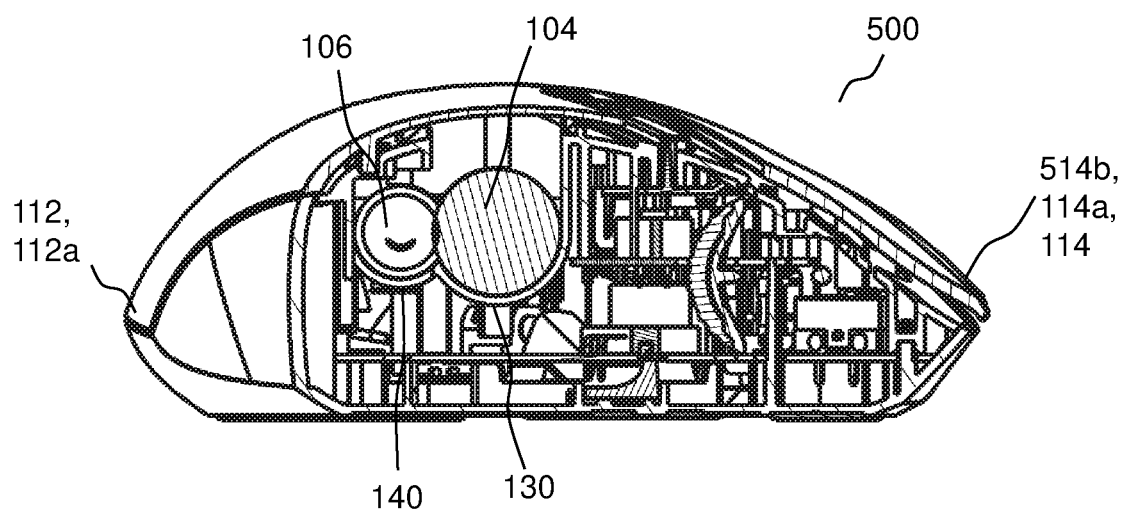
FIG. 5D shows a cross-sectional side view of the computer mouse of FIG. 5A and FIG. 5B with a second battery inserted into a second battery slot of a battery holder and a representation of a first battery at a first battery slot of the battery holder according to various embodiments.

FIG. 5A and FIG. 5B shows different views of a computer mouse 500 (or a battery-operated computer mouse), as an example of the battery-operated handheld device 100 of FIG. 1 to FIG. 4B, according to various embodiments. According to various embodiments, the computer mouse 500 is provided to illustrate an example implementation of the battery-operated handheld device 100 of FIG. 1 to FIG. 4B. Accordingly, the computer mouse 500 includes all the features and limitations of the battery-operated handheld device 100 of FIG. 1 to FIG. 4B and is described in the following with the same reference characters referring to the same/common parts throughout. FIG. 5A shows the computer mouse 500 with the cover part 116 of the housing 110 removed and with the second battery 106 inserted into the second battery slot 140 of the battery holder 120 according to various embodiments. FIG. 5B shows another view of the computer mouse 500 to illustrate an underneath surface 516a of the cover part 116 of the housing 110 according to various embodiments. FIG. 5C shows a top view of the computer mouse 500 without the cover part 116 and with the second battery 106 inserted into the second battery slot 140 of the battery holder 120 according to various embodiments. FIG. 5D shows a cross-sectional side view of the computer mouse 500 with the second battery 106 inserted into the second battery slot 140 of the battery holder 120 and a representation of the first battery 104 at the first battery slot 130 of the battery holder 120 according to various embodiments.

According to various embodiments, the computer mouse 500 may include the housing 110. The housing 110 may be an exterior casing of the computer mouse 500. According to various embodiments, the housing 110 may define an inner cavity to house or encase or enclose the electrical components 102 of the computer mouse 500. According to various embodiments, the electrical components 102 of the computer mouse 500 may include, but not limited to, one or a combination of a circuit board, integrated circuits, electronic components, sensors, detectors, receivers, transmitters, switches, processors, or memory. The electrical components 102 of the computer mouse 500 may be configured for serving as a handheld pointing device to control a graphical user interface of a computer.

According to various embodiments, the housing 110 of the computer mouse 500 may include the front region 112 and a rear palm-rest region 514b as the rear region 114.

According to various embodiments, the front region 112 may be directed away from a user and the rear palm-rest region 514b may be directed towards the user when the computer mouse 500 is in use while being held in the hand of the user. Accordingly, when the computer mouse 500 is placed on a table, the rear palm-rest region 514b of the computer mouse 500 may be received by the palm of the user with the user holding the computer mouse 500 such that the front region 112 of the computer mouse 500 may be directed or pointed away from the user. Hence, when the computer mouse 500 is in use and is being held in the hand of the user, the user may hold the computer mouse 500 with the front region 112 of the computer mouse 500 directed or pointed away from the user while the rear palm-rest region 514b of computer mouse 500 may be directed or pointed to the user. The front region 112 of the computer mouse 500 may be opposite the rear palm-rest region 514b of computer mouse 500.

According to various embodiments, the housing 110 of the computer mouse 500 may be an elongated housing 110a. According to various embodiments, the elongated housing 110a of the computer mouse 500 may include a longitudinal front end portion 112a and a longitudinal rear end portion 114a. The longitudinal front end portion 112a and the longitudinal rear end portion 114a may be two opposite longitudinal end portions of the elongate housing 110a. According to various embodiments, the longitudinal front end portion 112a may serve as the front region 112 of the computer mouse 500 and the longitudinal rear end portion 114a may serve as the rear palm-rest region 514b of the computer mouse 500. Accordingly, the longitudinal front end portion 112a may be directed away from the user and the longitudinal rear end portion 114a may be directed towards the user when the computer mouse 500 is in use while being held in the hand of the user.

According to various embodiments, the computer mouse 500 may include a battery holder 120. According to various embodiments, the battery holder 120 may be disposed within the housing 110 or the elongated housing 110a. Accordingly, the battery holder 120 may be housed or encased or enclosed by the housing 110 or the elongated housing 110a.

According to various embodiments, the battery holder 120 of the computer mouse 500 may include at least two (or two or more) battery slots 130, 140 (or battery bays) for receiving at least two (or two or more) different types of batteries 104, 106 (see for example FIG. 2A and FIG. 2B). The different types of batteries 104, 106 may be of different battery sizes. For example, a first type of battery 104 may have a first battery size and a second type of battery 106 may have a second battery size, which is different from the first battery size. According to various embodiments, the at least two battery slots 130, 140 of the battery holder 120 may be in a side-by-side arrangement. According to various embodiments, the electrical components 102 of the computer mouse 500 may be configured to be powered by one or more batteries of the same battery sizes. Accordingly, the electrical components 102 of the computer mouse 500 may be powered when one or more batteries of the first type is fitted into the battery holder 120 or when one or more batteries of the second type is fitted into the battery holder 120. According to various embodiments, when different types of batteries 104, 106 of different battery sizes are used in the computer mouse 500, a weight distribution of the computer mouse 500 may be changed or varied or altered or adjusted or customized. Accordingly, the user may selectively switch between using different types of batteries 104, 106 of different battery sizes to power up the computer mouse 500 so as to vary or adjust or customize the weight distribution of the computer mouse 500 depending on the hand sizes and wrist strength, as well as the different usage scenarios and/or requirements. For example, the user may flexibly switch between different types of batteries 104, 106 of different battery sizes to use smaller battery for reducing the overall weight of the computer mouse 500 or to use larger battery if battery life is more important.

According to various embodiments, the battery holder 120 of the computer mouse 500 may include a first battery slot 130 (or first battery bay) and a second battery slot 140 (or second battery bay). According to various embodiments, each of the first battery slot 130 and the second battery slot 140 may be a channel or a groove or a narrow elongated depression. According to various embodiments, the first battery slot 130 may be sized to hold the first battery 104 of the first battery size. According to various embodiments, the second battery slot 140 may be sized to hold the second battery 106 of the second battery size. The first battery size and the second battery size may be different battery sizes.

According to various embodiments, the second battery slot 140 may be alongside the first battery slot 130 so as to be in a side-by-side arrangement with the first battery slot 130. Accordingly, the first battery slot 130 and the second battery slot 140 may be parallel to each other, and may be immediately adjacent to each other such that the first battery slot 130 and the second battery slot 140 may be bordering each other.

According to various embodiments, the electrical components 102 of the computer mouse 500 may be powered by either the first battery 104 of the first battery size inserted into the first battery slot 130 of the battery holder 120, or the second battery 106 of the second battery size inserted into the second battery slot 140 of the battery holder 120. Accordingly, the electrical components 102 of the computer mouse 500 may be powered with only the first battery 104 of the first battery size inserted into the first battery slot 130 of the battery holder 120. The electrical components 102 of the computer mouse 500 may also be powered with only the second battery 106 of the second battery size inserted into the second battery slot 140 of the battery holder 120. Hence, the electrical components 102 of the computer mouse 500 may only require one of the first battery 104 or the second battery 106 to be fitted to the battery holder 120 to power the electrical components 102 of the computer mouse 500.

According to various embodiments, the battery holder 120 of the computer mouse 500 may be disposed in a manner so as to serve as an adjustable weight distribution mechanism to shift the centre of gravity of the computer mouse 500. Accordingly, by fitting the first battery 104 of the first battery size into the first battery slot 130 of the battery holder 120 or fitting the second battery 106 of the second battery size into the second battery slot 140 of the battery holder 120, the centre of gravity of the computer mouse 500 may be changed or varied or altered or adjusted or customized. Hence, by selectively fitting the first battery 104 or the second battery 106 to the battery holder 120 for powering the electrical components 102 of the computer mouse 500, the weight distribution of the computer mouse 500 may be changed or varied or altered or adjusted or customized so as to suit the user's hand sizes and/or wrist strength, as well as the different usage scenarios and/or requirements. Further, the battery holder 120 of the computer mouse 500 may also serve to provide flexibility of using different battery sizes at the user's disposal. For example, providing the user the options of using smaller battery for reducing the overall weight of the computer mouse 500 or using larger battery if battery life is more important.

According to various embodiments, the battery holder 120 of the computer mouse 500 serving as the adjustable weight distribution mechanism may shift the centre of gravity of the computer mouse 500 between a first predetermined centre of gravity 154 associated with the first battery 104 of the first battery size inserted into the first battery slot 130 of the battery holder 120 and a second predetermined centre of gravity 156 associated with the second battery 106 of the second battery size inserted into the second battery slot 140 of the battery holder 120. According to various embodiments, the second predetermined centre of gravity 156 may be rearward of the first predetermined centre of gravity 154 with respect to the front region 112 and the rear palm-rest region 514b of the housing 110 (or the longitudinal front end portion 112a and the longitudinal rear end portion 114a of the elongated housing 110a). Accordingly, the second predetermined centre of gravity 156 may be closer to the rear palm-rest region 514b of the housing 110 (or the longitudinal rear end portion 114a of the elongated housing 110a). Hence, the first predetermined centre of gravity 154 may be closer to the front region 112 of the housing 110 (or the longitudinal front end portion 112a of the elongated housing 110a) and may be forward of the second predetermined centre of gravity 156.

According to various embodiments, the battery holder 120 of the computer mouse 500 may be configured to serve as the adjustable weight distribution mechanism for switching the computer mouse 500 between different weight modes, including but not limited to, at least a balanced-weight mode and a rear-heavy mode, or a front-heavy mode and a balanced-weight mode, or a front-heavy mode and a rear-heavy mode. According to various embodiments, in the balanced-weight mode, the centre of gravity of the computer mouse 500 may be around a middle or centre of the computer mouse 500. According to various embodiments, in the front-heavy mode, the centre of gravity of the computer mouse 500 may be ahead of the middle or centre of the computer mouse 500 and towards the front region 112 of the housing 110 (or the longitudinal front end portion 112a of the elongated housing 110a). According to various embodiments, in the rear-heavy mode, the centre of gravity of the computer mouse 500 may be after the middle or centre of the computer mouse 500 and towards the rear palm-rest region 514b of the housing 110 (or the longitudinal rear end portion 114a of the elongated housing 110a).

According to various embodiments, the first predetermined centre of gravity 154 associated with the first battery 104 of the first battery size inserted into the first battery slot 130 of the battery holder 120 may be aligned to a battery-free centre of gravity of the computer mouse 500. The battery-free centre of gravity of the computer mouse 500 may be the centre of gravity of the computer mouse 500 when no batteries are inserted or fitted to the battery holder 120. In order words, the battery-free centre of gravity of the computer mouse 500 may be the centre of gravity of the computer mouse 500 when unladen or not loaded with batteries. Accordingly, the first predetermined centre of gravity 154 associated with the first battery 104 of the first battery size inserted into the first battery slot 130 of the battery holder 120 and the battery-free centre of gravity of the computer mouse 500 may coincide. Hence, the centre of gravity of the computer mouse 500 may not shift forward or rearward with respect to the front region 112 and the rear palm-rest region 514b of the housing 110 (or the longitudinal front end portion 112a and the longitudinal rear end portion 114a of the elongated housing 110a) regardless of whether the first battery 104 is inserted into the first battery slot 130 of the battery holder 120.

According to various embodiments, the first battery slot 130 of the battery holder 120 may correspond to the first predetermined centre of gravity 154 of the computer mouse 500. Accordingly, the first battery slot 130 of the battery holder 120 may serve as a visual indicator for a location of the first predetermined centre of gravity 154 of the computer mouse 500. For example, a centre of the first battery slot 130 of the battery holder 120 may be aligned to or may coincide with the first predetermined centre of gravity 154 of the computer mouse 500. Hence, the centre of the first battery slot 130 of the battery holder 120 may provide a visual reference for the location of the first predetermined centre of gravity 154 of the computer mouse 500.

According to various embodiments, the second battery slot 140 of the battery holder 120 may correspond to the second predetermined centre of gravity 156 of the computer mouse 500. Accordingly, the second battery slot 140 of the battery holder 120 may serve as a visual indicator for a location of the second predetermined centre of gravity 156 of computer mouse 500. For example, a centre of the second battery slot 140 of the battery holder 120 may be aligned to or may coincide with the second predetermined centre of gravity 156 of the computer mouse 500. Hence, the centre of the second battery slot 140 of the battery holder 120 may provide a visual reference for the location of the second predetermined centre of gravity 156 of the computer mouse 500.

According to various embodiments, the battery holder 120 of the computer mouse 500 may be disposed within the housing 110 (or the elongated housing 110a) in a manner such that each of the first battery slot 130 and the second battery slot 140 may be non-parallel with a front-and-rear centreline 111 extending perpendicularly between the front region 112 and the rear palm-rest region 514b of the housing 110 (or the longitudinal front end portion 112a and the longitudinal rear end portion 114a of the elongated housing 110a). The front-and-rear centreline 111 may run through a centre of the housing 110 (or the elongated housing 110a) from the front region 112 to the rear palm-rest region 514b (or from the longitudinal front end portion 112a to the longitudinal rear end portion 114a) so as to divide the housing 110 (or the elongated housing 110a) into two equal lateral portions. Accordingly, a slot axis of the first battery slot 130 may be at an angle or slanted with respect to the front-and-rear centreline 111. Similarly, a slot axis of the second battery slot 140 may be at an angle or slanted with respect to the front-and-rear centreline 111. According to various embodiments, each of the first battery slot 130 and the second battery slot 140 may intersect the front-and-rear centreline 111 at an angle. For example, each of the first battery slot 130 and the second battery slot 140 may intersect the front-and-rear centreline 111 diagonally or transversely. Accordingly, each of the first battery slot 130 and the second battery slot 140 may be oriented diagonally or transversely with respect to the front-and-rear centreline 111.

According to various embodiments, in the computer mouse 500, the first predetermined centre of gravity 154 associated with the first battery 104 of the first battery size inserted into the first battery slot 130 of the battery holder 120 and the second predetermined centre of gravity 156 associated with the second battery 106 of the second battery size inserted into the second battery slot 140 of the battery holder 120 may be along the front-and-rear centreline 111. Accordingly, each of first predetermined centre of gravity 154 and the second predetermined centre of gravity 156 may lie on the front-and-rear centreline 111 and be spaced apart from each other. Hence, by selectively fitting the first battery 104 or the second battery 106 to the battery holder 120, the weight distribution of the computer mouse 500 may be switched between the first predetermined centre of gravity 154 and the second predetermined centre of gravity 156 along the front-and-rear centreline 111.

According to various embodiments, in the computer mouse 500, the first predetermined centre of gravity 154 associated with the first battery 104 of the first battery size inserted into the first battery slot 130 of the battery holder 120 and the second predetermined centre of gravity 156 associated with the second battery 106 of the second battery size inserted into the second battery slot 140 of the battery holder 120 may be laterally offset from the front-and-rear centreline 111. Accordingly, each of first predetermined centre of gravity 154 and the second predetermined centre of gravity 156 may not lie on the front-and-rear centreline 111. According to various embodiments, the first predetermined centre of gravity 154 and the second predetermined centre of gravity 156 may be laterally offset to a same side from the front-and-rear centreline 111. According to various embodiments, the first predetermined centre of gravity 154 and the second predetermined centre of gravity 156 may be laterally offset to opposite sides from the front-and-rear centreline 111. According to various embodiments, one of the first predetermined centre of gravity 154 and the second predetermined centre of gravity 156 may be along the front-and-rear centreline 111 while another one of the first predetermined centre of gravity 154 and the second predetermined centre of gravity 156 may be laterally offset from the front-and-rear centreline 111. However, regardless of whether the first predetermined centre of gravity 154 and the second predetermined centre of gravity 156 is along the front-and-rear centreline 111 or laterally offset from the front-and-rear centreline 111, the second predetermined centre of gravity 156 may still be spaced rearward from the first predetermined centre of gravity 154 with respect to the with respect to the front region 112 and the rear palm-rest region 514b of the housing 110 (or the longitudinal front end portion 112a and the longitudinal rear end portion 114a of the elongated housing 110a).

According to various embodiments, in the computer mouse 500 (for example as shown in FIG. 5D), the width of the first battery slot 130 of the battery holder 120 may be smaller than the width of the first battery 104 and the width of the second battery slot 140 of the battery holder 120 may be smaller than the width of the second battery 106. Accordingly to various embodiments, when the first battery 104 is fitted to the first battery slot 130 of the battery holder 120, the side of the first battery 104 may protrude from the border of the first battery slot 130 so as to extend over or into the second battery slot 140 due to the width of the first battery 104 being wider than the width of the first battery slot 130. According to various embodiments, when the second battery 106 is fitted to the second battery slot 1430 of the battery holder 120, the side of the second battery 106 may protrude from a border of the second battery slot 140 so as to extend over or into the first battery slot 130 due to the width of the second battery 106 being wider than the width of the second battery slot 140. Accordingly, the battery holder 120 of the computer mouse 500 may prevent the first battery slot 130 receiving the first battery 104 simultaneously with the second battery slot 140 receiving the second battery 106. Hence, the battery holder 120 of the computer mouse 500 may not be fitted with the first battery 104 into the first battery slot 130 and the second battery 106 into the second battery slot 140 at the same time.

According to various embodiments, in the computer mouse 500, the housing 110 (or the elongated housing 110*a*) may include the cover part 116. According to various embodiments, the cover part 116 may be removably placed over the battery holder 120 to conceal the battery holder 120. According to various embodiments, the cover part 116 may be removably attached to the rest of the housing 110 (or the elongated housing 110*a*), or may be removably attached to the battery holder 120, or may be removably attached to internal frame structures of the battery-operated handheld device 100. According to various embodiments, in the computer mouse 500, the cover part 116 may be an upper part 515 of the housing 110 (or the elongated housing 110*a*). According to various embodiments, the housing 110 (or the elongated housing 110*a*) may include the upper part 515 and a base part 517. The upper part 515 and the base part 517 may be two separate parts of the housing 110 (or the elongated housing 110*a*). The upper part 515 may be a top case cover of the exterior casing of the computer mouse 500. The base part 517 may be a bottom case cover of the exterior casing of the computer mouse 500. According to various embodiments, assembling the upper part 515 and the base part 517 together may define the inner cavity for housing, or encasing, or enclosing the internal components 102 of the computer mouse 500. Accordingly, the upper part 515 may be removably coupled to the base part 517. According to various embodiments, the battery holder 120 may be fixedly coupled to or be integral with the base part 517 of the housing 110 (or the elongated housing 110*a*).

According to various embodiments, in the computer mouse 500, the cover part 116 may include the protrusion 118. According to various embodiments, the protrusion 118 may extend from the underneath surface 516*a* of the cover part 116. The underneath surface 516*a* of the cover part 116 may be facing the battery holder 120 when the cover part 116 is placed over the battery holder 120. According to various embodiments, the protrusion 118 may be extending towards the battery holder 120. According to various embodiments, the protrusion 118 may serve as the retainer or the stopper rib to prevent the first battery 104 or the second battery 106 from displacing or dislodging out of the first battery slot 130 or the second battery slot 140 respectively. Accordingly, an end face 518*a* of the protrusion 118 may be suspended above the first battery slot 130 and the second battery slot 140. Hence, when the first battery 104 is fitted into the first battery slot 130, a first portion 518*b* of the end face 518*a* of the protrusion 118 may be suspended above the first battery slot 130 so as to be loosely abutting the first battery 104. Similarly, when the second battery 106 is fitted into the second battery slot 140, a second portion 518*c* of the end face 518*a* of the protrusion 118 may be suspended above the second battery slot 140 so as to be loosely abutting the second battery 106. Thus, the first portion 518*b* and the second portion 518*c* of the end face of the protrusion 118 may respectively block or obstruct the first battery 104 or the second battery 106 from being displaced or dislodged out of the first battery slot 130 or the second battery slot 140 respectively. The first portion 518*b* of the end face 518*a* of the protrusion 118 may have a profile corresponding to the first battery 104. The second portion 518*c* of the end face 518*a* of the protrusion 118 may have a profile corresponding to the second battery 106.

According to various embodiments, the battery holder 120 of the computer mouse 500 may include a dongle socket 550. According to various embodiments, the dongle socket 550 may be configured to hold a dongle 508 for the computer mouse 500. The dongle 508 may be for plugging to a computer such that the computer mouse 500 may be wirelessly connected to the computer. According to various embodiments, the dongle socket 550 may be adjacent the second battery slot 140 such that the second battery slot 140 may be between the first battery slot 130 and the dongle socket 550. Accordingly, the dongle socket 550 may be alongside a longitudinal side of the second battery slot 140 that is opposite the first battery slot 130. According to various embodiments, the dongle socket 550 may be oriented parallel to the second battery slot 140.

According to various embodiments, in the computer mouse 500, the first battery slot 130 of the battery holder 120 may include the first pair of opposing support walls 132, 134 for respectively engaging the cap and the base of the first battery 104 so as to hold the first battery 104 therebetween. According to various embodiments, the first pair of opposing support walls 132, 134 may be at opposite longitudinal ends of the first battery slot 130 so as to define the length of the first battery slot 130. Accordingly, the first pair of opposing support walls 132, 134 may be spaced apart by the first predetermined distance, for defining the length of the first battery slot 130, so as to be sized to hold the first battery 104. Hence, the first predetermined distance may be equal or longer than the length of the first battery 104. According to various embodiments, the second battery slot 140 may include the second pair of opposing support walls 142, 144 for respectively engaging against the cap and the base of the second battery 106 so as to hold the second battery 106 therebetween. According to various embodiments, the second pair of opposing support walls 142, 144 may be at opposite longitudinal ends of the second battery slot 140 so as to define the length of the second battery slot 140. Accordingly, the second pair of opposing support walls 142, 144 may be spaced apart by the second predetermined distance, for defining the length of the second battery slot 140, so as to be sized to hold the second battery 106. Hence, the second predetermined distance may be equal or longer than the length of the second battery 106. According to various embodiments, the second predetermined distance may be different from the first predetermined distance since the first battery 104 and the second battery 106 are of different battery sizes. For example, the second predetermined distance may be shorter than the first predetermined distance when the first battery 104 is of a battery size (e.g. AA) that is longer than the second battery 106 of another battery size (e.g. AAA).

According to various embodiments, in the computer mouse 500, the first wall 132 of the first pair of opposing support walls of the first battery slot 130 may include the tab 136 and the second wall 134 of the first pair of opposing support walls of the first battery slot 130 may include the spring 138. According to various embodiments, the tab 136 and the spring 138 of the first battery slot 130 may respectively press against the cap and the base of the first battery 104 so as to cooperatively hold the first battery 104 in the first battery slot 130. According to various embodiments, the spring 138 may include, but not limited to, coil spring, conical spring, volute spring, flat spring, torsion spring, or disc spring. According to various embodiments, the tab 136 may be made of a conductive material for connecting the positive terminal of the first battery 104 at the cap of the first battery 104 to the electrical components 102 of the battery-operated handheld device 100. According to various embodiments, the spring 138 may be made of a conductive material for connecting the negative terminal of the first battery 104 at the base of the first battery 104 to the electrical components 102 of the battery-operated handheld device 100.

According to various embodiments, the first wall 142 of the second pair of opposing support walls of the second battery slot 140 may include the tab 146 and the second wall 144 of the second pair of opposing support walls of the second battery slot 140 may include the spring 148. According to various embodiments, the tab 146 and the spring 148 of the second battery slot 140 may respectively press against the cap and the base of the second battery 106 so as to cooperatively hold the second battery 106 in the second battery slot 140. According to various embodiments, the spring 148 may include, but not limited to, coil spring, conical spring, volute spring, flat spring, torsion spring, or disc spring. According to various embodiments, the tab 146 may be made of a conductive material for connecting the positive terminal of the second battery 106 at the cap of the second battery 106 to the electrical components 102 of the battery-operated handheld device 100. According to various embodiments, the spring 148 may be made of a conductive material for connecting the negative terminal of the second battery 106 at the base of the second battery 106 to the electrical components 102 of the battery-operated handheld device 100.

According to various embodiments, in the computer mouse 500, the first wall 132 of the first pair of opposing support walls of the first battery slot 130 and the first wall 142 of the second pair of opposing walls of the second battery slot 140 may be aligned. Accordingly, the first wall 132 of the first battery slot 130 and the first wall 142 of the second battery slot 140 may be side-by-side and may be continuous in a straight manner without interruption.

Various embodiments have provided a battery-operated handheld device or a computer mouse which allow a user to customize the weight distribution based their hand sizes and wrist strength, as well as the different usage scenarios and/or requirements. In various embodiments, the battery-operated handheld device or the computer mouse has been provided with a battery holder which the user may selectively fit with batteries of different battery size to adjust or customize or vary the weight distribution of the battery-operated handheld device or the computer mouse. Further, the battery-operated handheld device or the computer mouse has provided the user with the flexibility to use different battery types of different sizes as different options depending on whether weight distribution and/or battery life is more important. Accordingly, the battery-operated handheld device or the computer mouse has provided a simpler and more versatile solution for the user.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. A battery-operated handheld device comprising
a housing to enclose electrical components of the handheld device, the housing having a front region and a rear region, whereby the front region is directed away from a user and the rear region is directed towards the user when the handheld device is in use while being held in a hand of the user; and
a battery holder disposed within the housing, the battery holder comprising
a first battery slot sized to hold a first battery of a first battery size, and
a second battery slot alongside the first battery slot so as to be in a side-by-side arrangement with the first battery slot, the second battery slot sized to hold a second battery of a second battery size, the second battery size being different from the first battery size,
wherein the electrical components of the handheld device are powered by either the first battery of the first battery size inserted into the first battery slot of the battery holder or the second battery of the second battery size inserted into the second battery slot of the battery holder,
wherein the battery holder is disposed in a manner so as to serve as an adjustable weight distribution mechanism to shift a centre of gravity of the handheld device between a first predetermined centre of gravity associated with the first battery of the first battery size inserted into the first battery slot of the battery holder and a second predetermined centre of gravity associated with the second battery of the second battery size inserted into the second battery slot of the battery holder, wherein the second predetermined centre of gravity is rearward of the first predetermined centre of gravity with respect to the front region and the rear region of the housing.

2. The device as claimed in claim 1, wherein the first predetermined centre of gravity associated with the first battery of the first battery size inserted into the first battery slot of the battery holder is aligned to a battery-free centre of gravity of the handheld device.

3. The device as claimed in claim 1, wherein the battery holder is disposed within the housing in a manner such that each of the first battery slot and the second battery slot is non-parallel with a front-and-rear centreline extending perpendicularly between the front region and the rear region of the housing.

4. The device as claimed in claim 3, wherein the first predetermined centre of gravity associated with the first battery of the first battery size inserted into the first battery slot of the battery holder and the second predetermined centre of gravity associated with the second battery of the second battery size inserted into the second battery slot of the battery holder are along the front-and-rear centreline, or
wherein each of the first battery slot and the second battery slot is oriented diagonally with respect to the front-and-rear centreline.

5. The device as claimed in claim 1, wherein a width of the first battery slot of the battery holder is smaller than a width of the first battery and a width of the second battery slot of the battery holder is smaller than a width of the second battery in a manner so as to prevent the first battery slot receiving the first battery simultaneously with the second battery slot receiving the second battery.

6. A battery-operated handheld device comprising
an elongated housing to enclose electrical components of the handheld device, the elongated housing having a longitudinal front end portion and a longitudinal rear end portion, wherein the longitudinal front end portion and the longitudinal rear end portion are two opposite longitudinal end portions of the elongate housing; and
a battery holder disposed within the elongated housing, the battery holder comprising a first battery slot sized to hold a first battery of a first battery size, and a second battery slot alongside the first battery slot so as to be in a side-by-side arrangement with the first battery slot, the second battery slot sized to hold a second battery of a second battery size, the second battery size being different from the first battery size, wherein the electrical components of the handheld device are powered by either the first battery of the first battery size inserted into the first battery slot of the battery holder or the second battery of the second battery size inserted into the second battery slot of the battery holder, wherein the battery holder is disposed in a manner so as to serve as an adjustable weight distribution mechanism to shift a centre of gravity of the handheld device between a first predetermined centre of gravity associated with the first battery of the first battery size inserted into the first battery slot of the battery holder and a second predetermined centre of gravity associated with the second battery of the second battery size inserted into the second battery slot of the battery holder, wherein the second predetermined centre of gravity is rearward of the first predetermined centre of gravity with respect to the longitudinal front end portion and the longitudinal rear end portion of the elongated housing.

7. The device as claimed in claim 6, wherein the first predetermined centre of gravity associated with the first battery of the first battery size inserted into the first battery slot of the battery holder is aligned to a battery-free centre of gravity of the handheld device.

8. The device as claimed in claim 6, wherein the battery holder is disposed within the housing in a manner such that each of the first battery slot and the second battery slot is non-parallel with a front-and-rear centreline extending perpendicularly between the longitudinal front end portion and the longitudinal rear end portion of the housing.

9. The device as claimed in claim 8, wherein the first predetermined centre of gravity associated with the first battery of the first battery size inserted into the first battery slot of the battery holder and the second predetermined centre of gravity associated with the second battery of the second battery size inserted into the second battery slot of the battery holder are along the front-and-rear centreline, wherein each of the first battery slot and the second battery slot is oriented diagonally with respect to the front-and-rear centreline.

10. The device as claimed in claim 6, where the first battery slot comprises a first pair of opposing support walls for respectively engaging a cap and a base of the first battery so as to hold the first battery therebetween, the first pair of opposing support walls being spaced apart by a first predetermined distance so as to be sized to hold the first battery, wherein the second battery slot comprises a second pair of opposing support walls for respectively engaging against a cap and a base of the second battery so as to hold the second battery therebetween, the second pair of opposing support walls being spaced apart by a second predetermined distance so as to be sized to hold the second battery, the second predetermined distance being different from the first predetermined distance.

11. The device as claimed in claim 10, wherein the second predetermined distance is shorter than the first predetermined distance, or wherein a first wall of each of the first and second pair of opposing support walls comprises a tab and a second wall of each of the first and second pair of opposing support walls comprises a spring such that the tab and the spring may respectively press against the cap and the base of the first battery or the second battery.

12. A battery-operated computer mouse comprising a housing to enclose electrical components of the computer mouse, the housing having a rear palm-rest region and a front region opposite the rear palm-rest region; and a battery holder disposed within the housing, the battery holder comprising a first battery slot sized to hold a first battery of a first battery size, and a second battery slot alongside the first battery slot so as to be in a side-by-side arrangement with the first battery slot, the second battery slot sized to hold a second battery of a second battery size, the second battery size being different from the first battery size, wherein the electrical components of the computer mouse are powered by either the first battery of the first battery size inserted into the first battery slot of the battery holder or the second battery of the second battery size inserted into the second battery slot of the battery holder, wherein the battery holder is disposed in a manner so as to serve as an adjustable weight distribution mechanism to shift a centre of gravity of the computer mouse between a first predetermined centre of gravity associated with the first battery of the first battery size inserted into the first battery slot of the battery holder and a second predetermined centre of gravity associated with the second battery of the second battery size inserted into the second battery slot of the battery holder, wherein the second predetermined centre of gravity is rearward of the first predetermined centre of gravity with respect to the front region and the rear palm-rest region of the housing.

13. The computer mouse as claimed in claim 12, wherein the first predetermined centre of gravity associated with the first battery of the first battery size inserted into the first battery slot of the battery holder is aligned to a battery-free centre of gravity of the computer mouse.

14. The computer mouse as claimed in claim 12, wherein the battery holder is disposed within the housing in a manner such that each of the first battery slot and the second battery slot is non-parallel with a front-and-rear centreline extending perpendicularly between the front region and the rear palm-rest region of the housing.

15. The computer mouse as claimed in claim 14, wherein the first predetermined centre of gravity associated with the first battery of the first battery size inserted into the first battery slot of the battery holder and the second predetermined centre of gravity associated with the second battery of the second battery size inserted into the second battery slot of the battery holder are along the front-and-rear centreline, or wherein each of the first battery slot and the second battery slot is oriented diagonally with respect to the front-and-rear centreline.

16. The computer mouse as claimed in claim 12, wherein the housing comprises a cover part removably placed over the battery holder to conceal the battery holder, wherein the cover part comprises a protrusion extending towards the battery holder, the protrusion serving as a retainer to prevent the first battery or the second battery from displacing out of the first battery slot or the second battery slot respectively.

17. The computer mouse as claimed in claim 16, wherein the cover part is an upper part of the housing and the battery holder is fixedly coupled to or integral with a base part of the housing, or wherein the protrusion comprises a free-end having an end face with a first portion suspended above the first battery slot and a second portion suspended above the second battery slot, wherein the first portion has a profile corresponding to the first battery and the second portion has a profile corresponding to the second battery.

18. The computer mouse as claimed in claim 12, wherein the battery holder comprises a dongle socket to hold a dongle for the computer mouse, the dongle socket being adjacent the second battery slot such that the second battery slot is between the first battery slot and the dongle socket.

19. The computer mouse as claimed in claim 12, where the first battery slot comprises a first pair of opposing support walls for respectively engaging a cap and a base of the first battery so as to hold the first battery therebetween, the first pair of opposing support walls being spaced apart by a first predetermined distance so as to be sized to hold the first battery, wherein the second battery slot comprises a second pair of opposing support walls for respectively engaging against a cap and a base of the second battery so as to hold the second battery therebetween, the second pair of opposing support walls being spaced apart by a second predetermined distance so as to be sized to hold the second battery, the second predetermined distance being different from the first predetermined distance.

20. The computer mouse as claimed in claim 19, wherein the second predetermined distance is shorter than the first predetermined distance, or Wherein a first wall of each of the first and second pair of opposing support walls comprises a tab and a second wall of each of the first and second pair of opposing support walls comprises a spring such that the tab and the spring may respectively press against the cap and a base of the first battery or the second battery, or wherein the first wall of the first pair of opposing support walls of the first battery slot and the first wall of the second pair of opposing walls of the second battery slot are aligned.

* * * * *